United States Patent
Khaghani et al.

(10) Patent No.: US 9,978,285 B2
(45) Date of Patent: May 22, 2018

(54) AUTONOMOUS AND NON-AUTONOMOUS DYNAMIC MODEL BASED NAVIGATION SYSTEM FOR UNMANNED VEHICLES

(71) Applicant: ECOLE POLYTECHNIQUE FEDERALE DE LAUSANNE (EPFL), Lausanne (CH)

(72) Inventors: Mehran Khaghani, La Croix sur Lutry (CH); Jan Skaloud, Bussigny-Lausanne (CH)

(73) Assignee: ECOLE POLYTECHNIQUE FEDERALE DE LAUSANNE (EPFL), Lausanne (CH)

( * ) Notice: Subject to any disclaimer, the term of this patent is extended or adjusted under 35 U.S.C. 154(b) by 0 days. days.

(21) Appl. No.: 15/176,283

(22) Filed: Jun. 8, 2016

(65) Prior Publication Data
US 2016/0364990 A1 Dec. 15, 2016

Related U.S. Application Data

(60) Provisional application No. 62/173,443, filed on Jun. 10, 2015.

(51) Int. Cl.
*G08G 5/00* (2006.01)
*G01C 21/16* (2006.01)
(Continued)

(52) U.S. Cl.
CPC .......... *G08G 5/0069* (2013.01); *G01C 21/165* (2013.01); *G01S 19/42* (2013.01); *G05D 1/0088* (2013.01); *G05D 1/101* (2013.01)

(58) Field of Classification Search
CPC .... G08G 5/0069; G01C 21/165; G01S 19/42; G05D 1/0088; G05D 1/101
(Continued)

(56) References Cited

PUBLICATIONS

Lennon R Cork et al: "Aircraft dynamic navigation for unmanned aerial vehicles", PhD dissertation, May 29, 2014, pp. 1-203, XP055319936, Brisbane, Australia Retrieved from the internet [on Nov. 15, 2016]: URL:http://eprints.qut.edu.au/71396/1/Lennon_Cork_Thesis.pdf.*

(Continued)

*Primary Examiner* — Yazan A Soofi
(74) *Attorney, Agent, or Firm* — Seyfarth Shaw LLP; Brian Michaelis

(57) ABSTRACT

A navigation system including a vehicle dynamic model (VDM) that serves as the main process model within a navigation filter is described. When used in an unmanned aerial vehicle (UAV), the navigation system may work in communication with inertial measurement units (IMUs) and environment dependent sensors such as GNSS receivers. Particularly, the navigation system is beneficial in the case of GNSS signal reception outages, where conventional IMU coasting drifts quickly. Yet, the navigation system may also be employed in other scenarios, for example during GNSS presence for improved positioning, velocity and attitude determination, or in combination with GNSS when no IMU is available by design or due to a failure. In the navigation system, a solution to VDM equations provides an estimate of position, velocity, and attitude, which can be updated within a navigation filter based on available observations, such as IMU data or GNSS measurements.

20 Claims, 23 Drawing Sheets

(51) Int. Cl.
    *G01S 19/42* (2010.01)
    *G01D 1/10* (2006.01)
    *G05D 1/00* (2006.01)
    *G05D 1/10* (2006.01)

(58) Field of Classification Search
    USPC .......................................................... 701/3
    See application file for complete search history.

(56) References Cited

PUBLICATIONS

International Search Report, dated Nov. 24, 2016, Applicant: Ecole Polytechnique Federale De Lausanne (EPFL), 15 pages.

Lennon R Cork et al: 'Aircraft dynamic navigation for unmanned aerial vehicles', PhD dissertation, May 29, 2014 (May 29, 2014), pp. 1-203.

M. Khaghani et al: "Autonomous Navigation of Small UAVS Based on Vehicle Dynamic Model", ISPRS—International Archives of the Photogrammetry, Remote Sensing and Spatial Information Sciences, vol. XL-3/W4, Mar. 17, 2016 (Mar. 17, 2016), pp. 117-122.

Mitch Bryson et al: "Vehicle Model Aided Inertial Navigation for a UAV using Low-cost Sensors", Proceedings of the Australasian Conference on Robotics and Automation, Dec. 30, 2004 (Dec. 30, 2004), pp. 1-9.

\* cited by examiner

FIG. 19A

| Symbol | Description |
|---|---|
| $\otimes$ | quaternion product |
| $[\mathbf{v}]_q$ | quaternion representation of vector $\mathbf{v}$, defined as $[0, \mathbf{v}^T]^T$ |
| $\dot{x}$ | time derivative of $x$ |
| $\dfrac{\partial x}{\partial y}$ | partial derivative of $x$ with respect to $y$ |
| $\alpha$ | angle of attack |
| $\beta$ | sideslip angle |
| $\delta_a$ | aileron deflection |
| $\delta_e$ | elevator deflection |
| $\delta_r$ | rudder deflection |
| $\lambda$ | ellipsoidal longitude |
| $\Lambda$ | astronomical longitude |
| $\pi$ | the ratio between the circumference of any circle to its diameter |
| $\rho$ | air density |
| $\sigma$ | standard deviation |
| $\tau_n$ | time constant of the propeller dynamics |
| $\phi$ | ellipsoidal latitude |
| $\Phi$ | astronomical latitude |
| $\boldsymbol{\omega}_{bc}^a$ | angular velocity vector of c-frame with respect to b-frame, expressed in a-frame |
| $\omega_{ie}$ | Earth rotation rate magnitude |
| $\omega_x$ | roll rate along $x_b$ |
| $\tilde{\omega}_x$ | dimensionless roll rate along $x_b$ |
| $\omega_y$ | pitch rate along $y_b$ |
| $\tilde{\omega}_y$ | dimensionless pitch rate along $y_b$ |
| $\omega_z$ | yaw rate along $z_b$ |
| $\tilde{\omega}_z$ | dimensionless yaw rate along $z_b$ |
| $\Omega_{bc}^a$ | skew-symmetric matrix representation of $\boldsymbol{\omega}_{bc}^a = [\omega_1, \omega_2, \omega_3]^T$ as $\begin{bmatrix} 0 & -\omega_3 & \omega_2 \\ \omega_3 & 0 & -\omega_1 \\ -\omega_2 & \omega_1 & 0 \end{bmatrix}$ |
| $a$ | semi-major axis of reference ellipsoid/air temperature gradient |
| $b$ | wing span |
| $b_{rw}$ | IMU error term, random walk |
| $\bar{c}$ | mean aerodynamic chord |
| $C_b^a$ | rotation matrix from b-frame to a-frame, so that for any vector $\mathbf{v}$: $\mathbf{v}^a = C_b^a \mathbf{v}^b$ |
| $C_i$ | elementary rotation matrix about $i^{th}$ coordinate |
| $C_{F_T\ldots}$ | thrust force coefficients |

FIG. 19B

| Symbol | Description |
|---|---|
| $C_{F_x\ldots}$ | drag force coefficients |
| $C_{F_y\ldots}$ | side force coefficients |
| $C_{F_z\ldots}$ | lift force coefficients |
| $C_{M_x\ldots}$ | roll moment coefficients |
| $C_{M_y\ldots}$ | pitch moment coefficients |
| $C_{M_z\ldots}$ | yaw moment coefficients |
| $D$ | propeller diameter |
| $e$ | eccentricity of reference ellipsoid |
| $\mathbf{f}^a$ | specific force vector expressed in a-frame |
| $F$ | dynamic matrix |
| $F_T$ | thrust force |
| $F_x^w$ | drag force along $x_w$ |
| $F_y^w$ | side force along $y_w$ |
| $F_z^w$ | lift force along $z_w$ |
| $\mathbf{g}^a$ | gravity acceleration vector expressed in a-f |
| $G$ | noise shaping matrix |
| $h$ | height |
| $H$ | linearized observation model matrix |
| $I$ | identity matrix |
| $I^b$ | matrix of mass moments of inertia, expressed in b-frame |
| $J$ | thrust advance ratio |
| $m$ | UAV mass |
| $\mathbf{M}^a$ | moment vector expressed in a-frame |
| $M_x^b$ | roll moment, expressed in body frame |
| $M_y^b$ | pitch moment, expressed in body frame |
| $M_z^b$ | yaw moment, expressed in body frame |
| $n$ | propeller speed |
| $n_c$ | commanded propeller speed |
| $p$ | pitch |
| $p_0$ | ambient pressure at zero height |
| $\bar{q}$ | dynamic pressure |
| $\mathbf{q}_b^l$ | quaternion representing orientation of body frame with respect to local frame |
| $r$ | roll |
| $\mathbf{r}$ | measurement noise vector |
| $\mathbf{r}_e^l$ | position vector in e-frame and in elliptical coordinates |
| $R_a$ | gas constant for air |

FIG. 19C

| Symbol | Description |
|---|---|
| $R_M$ | meridian radius of curvature |
| $R_P$ | prime vertical radius of curvature |
| $S$ | wing surface |
| $T$ | correlation time |
| $T_0$ | ambient temperature at zero height |
| $U$ | control input vector |
| $v$ | UAV velocity vector |
| $v_x^b$ | velocity component along $x_b$ |
| $v_y^b$ | velocity component along $y_b$ |
| $v_z^b$ | velocity component along $z_b$ |
| $V$ | airspeed |
| $\mathbf{V}$ | airspeed vector |
| $V_x^b$ | airspeed component along $x_b$ |
| $V_y^b$ | airspeed component along $y_b$ |
| $V_z^b$ | airspeed component along $z_b$ |
| $w$ | wind velocity vector |
| $w_x^l$ | wind velocity component along $x_l$ |
| $w_y^l$ | wind velocity component along $y_l$ |
| $w_z^l$ | wind velocity component along $z_l$ |
| $W$ | white noise vector |
| $x_a$ | first axis in Cartesian a-frame |
| $\mathbf{X}_n$ | vector of navigation states |
| $\mathbf{X}_p$ | vector of UAV dynamic model parameters states |
| $\mathbf{X}_c$ | vector of IMU error states |
| $\mathbf{X}_w$ | vector of wind velocity states |
| $y$ | yaw |
| $y_a$ | second axis in Cartesian a-frame |
| $z_a$ | third axis in Cartesian a-frame |
| $Z$ | measurements vector |

AUTONOMOUS AND NON-AUTONOMOUS DYNAMIC MODEL BASED NAVIGATION SYSTEM FOR UNMANNED VEHICLES

CROSS-REFERENCE TO RELATED APPLICATION

This application claims priority to U.S. provisional patent application No. 62/173,443, filed Jun. 10, 2015, which is incorporated herein in its entirety.

FIELD

The present disclosure relates generally to navigation, and more particularly to vehicle navigation using dynamic models.

BACKGROUND

A predominant navigation system for unmanned aerial vehicles (UAVs) today is based on inertial navigation system (INS) and global navigation satellite system (GNSS) integration. GNSS provides absolute time, position, and velocity (TPV) data for the UAV at a relatively low frequency of only a few hertz (Hz), while INS provides position and attitude data at much higher frequencies than GNSS, typically at a few hundred Hz. The integration of INS and GNSS data can provide solutions with short-term and long-term accuracy. However, problems arise when GNSS outage occurs, which is not rare and can happen due to intentional corruption of GNSS signal reception (i.e., jamming or spoofing) or unintentionally (i.e., loss of line of sight to the satellites or interference in satellite signal reception). When GNSS outage occurs, navigation is based solely on INS with possible aiding from aids such as barometric altimeters. The accuracy of the data provided by INS is directly determined by the quality of an inertial measurement unit (IMU) used in the system. The long-term accuracy of three dimensional (3D) inertial coasting is low, especially when based on small and low-cost IMUs presently available for small UAVs. Thus, after only a few minutes of GNSS outage, the position uncertainty of the UAV makes the UAV navigation solution far from being of practical use. In other words, unless drift is controlled by other means, the UAV is completely lost in space or may even become dynamically unstable. This may cause serious problems, especially in non-line-of-sight flights, and can lead to loss of the UAV with possible damage to people, animals, or other objects on the ground.

Several approaches have been proposed to address the aforementioned problem of rapid drift during GNSS outage conditions, with each having their own drawbacks. One approach has tried to improve INS error modeling using advanced sensor error modeling techniques, while another approach has chosen to employ additional navigation sensors to aid the navigation system. The former approach fails to provide sufficient improvements for UAVs. The latter approach adds cost and complexity to the UAV and, more importantly, UAV performance according to the second approach depends on environmental conditions that are not always met. This challenges the navigation autonomy of the UAV.

A widely used (yet partial) solution to the aforementioned second approach employs vision based methods that provide relative or absolute measurements to navigation. Apart from adding extra weight and hardware and software complications, correct functioning of the vision based methods requires prerequisites regarding light, visibility, and terrain texture. For example, the vision based methods might not work at night, in foggy conditions, or over ground with uniform texture (e.g., vegetation, water, snow, etc.).

Other proposed solutions integrate vehicle dynamic models (VDMs) to improve navigation accuracy, especially in GNSS outage conditions. Most of these techniques employ kinematic modeling (i.e., INS) as the main process model within a navigation filter, while using the VDM output either in a prediction phase or in an update phase within the navigation filter. Hence, approaches utilizing VDMs rely entirely on the IMU and therefore are not robust if IMU failure occurs. Other solutions have considered using both INS and VDM at the same level within the navigation filter but, like the aforementioned VDM methodology, these solutions are also based on navigation filtered INS output. Therefore, IMU failure disables navigation in these solutions as well.

SUMMARY

The present disclosure provides systems, methods, and devices that increase the accuracy and reliability of autonomous navigation of, for example, UAVs.

An aspect of the present disclosure employs a vehicle dynamic model (VDM) in the navigation system of the UAV. Unlike traditional methods of kinematic modeling in which an inertial measurement unit serves as a navigation process model within the navigation filter, the navigation filter of the present disclosure features the VDM as the navigation process model. A navigation solution generated using VDM output can benefit from autonomous sensors such as an IMU for its autonomous part, and environment dependent sensors such as a GNSS receiver when available.

Generally, the navigation platform of the present disclosure utilizes available information of the VDM and control input within the navigation system that implicitly rejects physically impossible movements suggested by the IMU due to its errors. The present disclosure does not require any additional sensors, thereby preserving the autonomy of the navigation platform when GNSS outages occur. By not adding any additional sensors, additional cost and weight to the UAV are mitigated or eliminated.

According to the disclosure, the VDM beneficially acts as the main process model within a navigation filter, with the VDM output being updated with raw IMU observations, and GNSS measurements (e.g., position measurement data, velocity measurement data, receiver to satellite distance related measurements, etc.) and any other sensory data if available. Such architecture avoids the complications of multi-process model filter implementations, and thus leads to simpler filter implementation, smaller state vector, and less computation cost. The architecture of the present disclosure is also beneficial as compared to architectures in which INS is the main process model, which gets updated by the VDM. For example, when IMU failure occurs, the herein disclosed architecture may simply stop using IMU observations, while architectures including INS as the main process model will fail. For further example, the high frequency measurement noise in IMU data causes divergence in navigation solution when integrated within the navigation filter, and mechanical vibrations on the platform also affect the IMU measurements, but not the VDM output. Therefore, treating the IMU data as observations and avoiding integration of them as a process model improves error growth.

Since the VDM is a mathematical model that does not rely on extra sensors, the herein described navigation platform adds no additional cost or complexity to the system in terms of hardware. However, it is necessary to feed the VDM with the control input to the UAV. This information is already available in the control/autopilot system, but may need to be put in correct time relations with IMU and other measurements. It may also be desirable to input wind velocity measurements into the VDM. The teachings of the present disclosure make it possible to estimate the wind velocity within the navigation filter itself, even in the absence of air pressure sensors. When the air pressure sensor is available, this adds redundancy to the system in case of misbehavior of this sensor.

A proper structure for the VDM may be determined based on the host UAV type (e.g., fixed wing, copter, etc.) and its control actuators. This is because some parameters in the VDM may depend on UAV configuration. The parameters can be either identified and pre-calibrated, or estimated during navigation. By using online (i.e., during navigation) parameter estimation (i.e., dynamic model identification) that does not require pre-calibration, the effort required in design and operation is minimized in this disclosure.

In addition to navigation states, VDM parameters and wind velocity components can be estimated within the navigation filter, as well as sensor errors and other states such as misalignment between different sensors. The VDM parameters may be calibrated in flight, and such calibration is possible even if GNSS signal reception is not available. The navigation filter disclosed herein is thus polyvalent as it can accommodate changes in the UAV and/or environmental conditions, such as wind acting on the UAV.

Teachings of the present disclosure are particularly useful when GNSS signal reception is disrupted (e.g., due to electromagnetic interference). Specifically, the herein described navigation platform improves the accuracy of navigation and significantly mitigates the drift of navigation uncertainty during GNSS signal reception absence. Such gain of navigation autonomy is internal to the UAV, and is therefore very much suitable for limited or zero-visibility operations. Time-correlated errors in accelerometers, gyroscopes, and wind velocity components may be estimated within the navigation filter.

The illustrative embodiment presented herein considers a fixed wing UAV. However, one skilled in the art should appreciate that the teachings herein are applicable to other vehicles. While fixed wing and rotary wing UAVs can benefit considerably from the navigation platform disclosed herein, underwater vehicles, terrestrial vehicles, and mobile robots including bio-inspired ones are other platforms in which the teachings herein may be employed. Generally, the level of improvement in navigation accuracy and reliability delivered by the present disclosure may be higher for platforms with small IMUs, which normally have a performance proportional to their size. However, the present disclosure is not so limited in that the navigation platform may be useful in UAVs with higher grade IMUs on board, such as large UAVs and man-operated planes and helicopters.

The herein presented navigation results were focused on a GNSS outage condition, during which an IMU is the only available sensor. However, it should be appreciated that the present disclosure can be employed in other scenarios such as positioning and attitude determination during GNSS presence for improved accuracy, or in combination with GNSS when no IMU is available by design or due to failure.

BRIEF DESCRIPTION OF THE DRAWINGS

Embodiments of devices, systems, and methods are illustrated in the figures of the accompanying drawings, which are meant to be exemplary and non-limiting, in which like references are intended to refer to like or corresponding parts, and in which:

FIGS. 19A through 19C contain nomenclature for components of the present disclosure.

DETAILED DESCRIPTION

The present disclosure provides systems, methods, and devices for increasing the accuracy and reliability of autonomous navigation of UAVs by employing a VDM as a main process model for navigation. The VDM may use input from "autonomous sensors" and "environment dependent sensors." Autonomous sensors provide data regardless of environmental features and conditions such as texture, visibility, or signal reception condition. Illustrative autonomous sensors include IMUs, pressure sensors, and the like. On the other hand, environment dependent sensors provide data dependent upon environment features and conditions such as texture, visibility, or signal reception condition. Illustrative environment dependent sensors include radio frequency (RF) ranging sensors, GNSS receivers, and vision based sensors, and the like.

FIGS. 19A through 19C contain nomenclature for components of the present disclosure.

Figure 1:
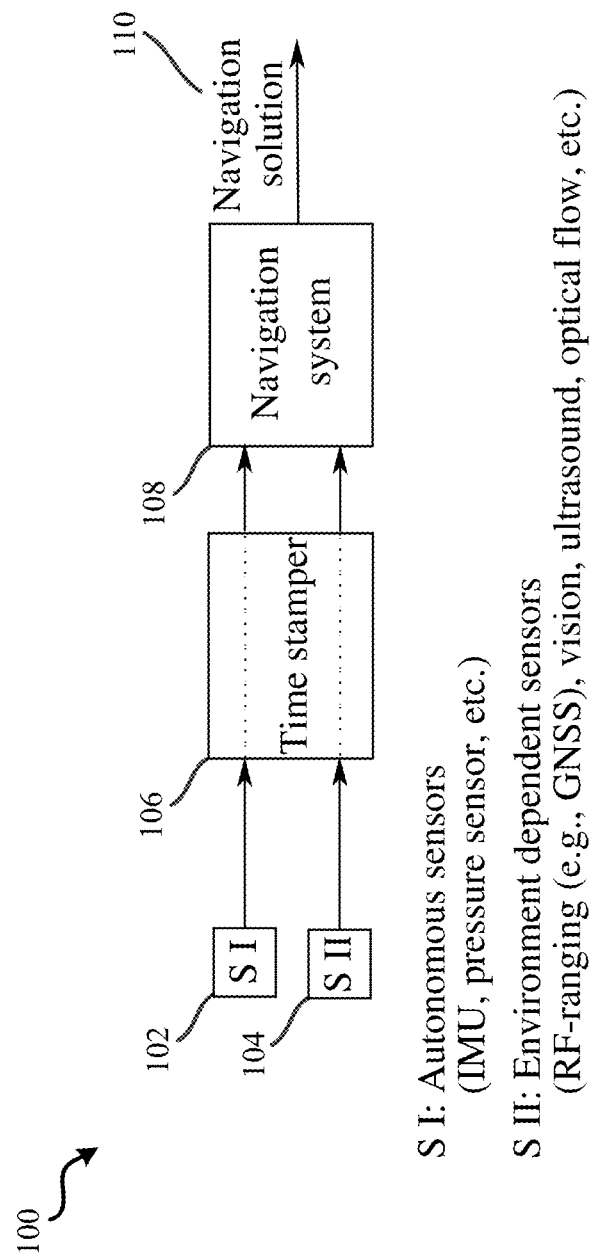
FIG. 1 illustrates a navigation platform of a UAV.

FIG. 1 illustrates a UAV navigation platform 100 wherein data from at least one autonomous sensor 102 and at least one environment dependent sensor 104 are interconnected in a navigation system 108 to provide a navigation solution 110. Time stamping of data gathered by the autonomous sensor(s) 102 and environment dependent sensor(s) 104 may be handled inside the sensors or externally (i.e., by a time stamper 106 interspersed between the sensors and the navigation system 108, as illustrated in FIG. 1). While one time stamper 106 is illustrated, it should be appreciated that more than one time stamper 106 may be used. For example, each sensor may have its own dedicated, external time stamper, autonomous sensor(s) 102 may be dedicated to a first external time stamper and environment dependent sensor(s) 104 may be dedicated to a second external time stamper, etc.

Figure 2:
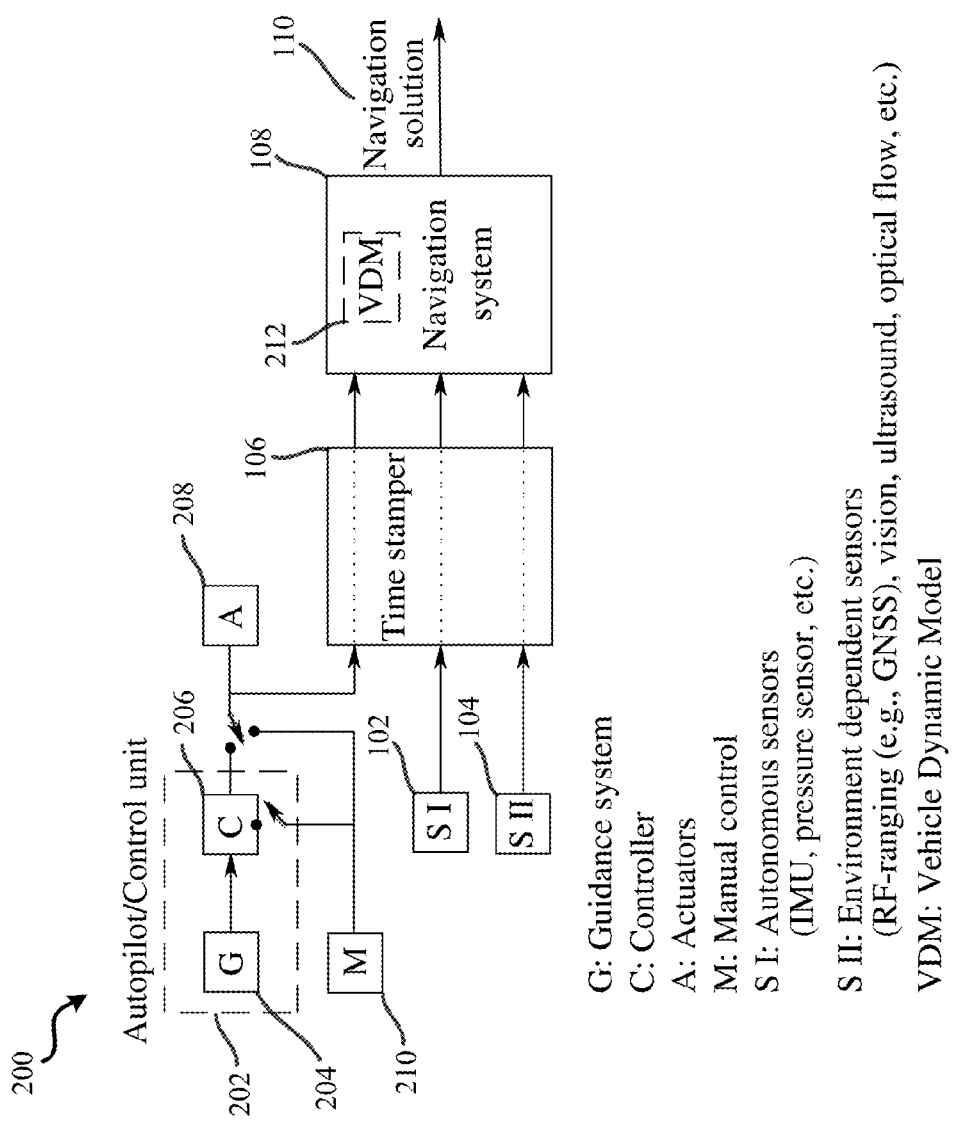
FIG. 2 illustrates the integration of information of a vehicle dynamic model within a navigation platform of a UAV.

FIG. 2 illustrates a UAV navigation platform 200 including a vehicle dynamic model 212 (VDM) integrated within the navigation system 108. The VDM 212 may be a process model in a Kalman filter. The navigation system 108 is fed with a control input to the UAV, which is the same data that is fed to one or more actuators 208. As illustrated, an autopilot/control unit 202, a manual control 210, and the actuator(s) 208 are in communication via switches. The actuator(s) 208 may be commanded either by the autopilot 202 or the manual control 210 via a double throw switch. The manual control 210 may communicate with the controller 206 via a single throw switch. Using this illustrative configuration of switches results in the potential for various sources of data to be sent to the navigation system 108. In an example, only data from the autopilot 202 may be fed to the actuator(s) 208 and navigation system 108, regardless of the manual control 210 data. In another example, only the manual control 210 data may be fed to the actuator(s) 208 and navigation system 108, regardless of the autopilot 202 data. In a further example, the manual control 210 data may be fed to the actuator(s) 208 and navigation system 108 through the controller 206.

The autopilot 202 may include a guidance system 204 and a controller 206. In an example, data from the guidance system 204 passes through the controller 206 and is fed to the actuator(s) 208 and navigation system 108. In another example, the manual control 210 data is directly fed to the actuator(s) 208 and navigation system 108. In a further example, the manual control 210 data passes through the controller 206 (e.g., for stabilization of the UAV) and is fed to the actuator(s) 208 and navigation system 108, regardless of the guidance system 204 data.

Time stamping of the autopilot 202 or manual control 210 data may be handled inside the respective devices or externally (e.g., by the time stamper 106). While it is illustrated that a single external time stamper 106 stamps all data transmitted to the navigation system 108, it should be appreciated that more than one external time stamper 106 may be used. For example, each data source may have its own dedicated, external time stamper, the sensors 102/104 may have one dedicated time stamper while all other data sources may have a separate dedicated time stamper, etc.

Depending on the specific sensors used by the navigation platform 200 (i.e., implemented on the UAV), there may be certain requirements on the hardware usable within the navigation platform 200. For example, the autopilot/control unit 202 data output to the actuator(s) 208 (i.e., the control input to the navigation platform 200) may need to be accessible by the navigation system 108 (since this information is used by the VDM 212) and time-stamped with respect to other sensory data. For autonomous navigation, an IMU autonomous sensor 102 is usually a minimum sensor setup concern. However, it is possible for the navigation platform 200 to work without an IMU autonomous sensor 102, but a GNSS receiver environment dependent sensor 104 or other sensor setup allowing 3D position fixes may be required for desired results. Since an IMU autonomous sensor 102 is almost always used within a navigation platform for UAVs, omission of the IMU autonomous sensor 102 from the platform may be most beneficial as a backup solution in case of IMU autonomous sensor 102 failure, thereby increasing the reliability of the whole navigation platform. It may be desirable to properly reference the control input and the data from all the sensors to a common time scale in order for the control input and sensor data to be used within the navigation system 108. This may require a hardware/software time stamper 106 to perform data tagging with respect to a common time reference. Depending on the configuration of the sensors 102/104, a partial synchronization may be performed in other manners. For example, in the situation where both an IMU autonomous sensor 102 and a GNSS receiver environment dependent sensor 104 are available, there may be a connection between them in which the GNSS receiver environment dependent sensor 104 time frame is used to tag IMU autonomous sensor 102 data. A synchronization unit may also be available within the control unit 202.

Navigation System Frames

Five frames may be used within the navigation system 108.

An inertial frame (i-frame) is a non-accelerating and non-rotating reference frame that is at rest or subject to a uniform translational motion. In such a frame, the laws of Newtonian mechanics are valid. An i-frame is a celestial frame with an origin at the center of mass of Earth, such that an $x_i$-axis of the i-frame points towards the vernal equinox and, thus, is the intersection line between the equatorial and the ecliptic plane. A $z_i$-axis of the i-frame points towards the mean celestial pole, and a $y_i$-axis of the i-frame completes the system to a 3D right-handed Cartesian system.

An earth frame (e-frame) is an equatorial frame with an origin at the center of mass of Earth, such that an $x_e$-axis of the e-frame points towards the Greenwich meridian, a $z_e$-axis of the e-frame points towards the mean direction of the rotation axis of Earth, and a $y_e$-axis of the e-frame completes the system to a 3D right-handed Cartesian system. The e-frame is therefore an Earth Centered Earth Fixed (ECEF) frame. Examples of e-frames include the International Terrestrial Reference Frame (ITRF) and the World Geodetic System WGS-84, which is the reference frame of the American Global Positioning System (GPS). When an ellipsoid of reference is associated with the frame, as in the WGS-84 datum, any point in the e-frame can be expressed either in Cartesian coordinates ($x_e,y_e,z_e$) or ellipsoidal coordinates ($\phi,\lambda,h$) with $\phi$ being the latitude, $\lambda$ being the longitude, and h being the ellipsoidal height.

A local-level frame (l-frame) is a local geodetic frame with an arbitrary origin, for example a point on Earth's surface (i.e., topocenter). An illustrative l-frame is a North-East-Down (NED) frame, which has a $x_l$-axis that points North, a $y_l$-axis that points East, and a $z_l$-axis that points to the local nadir (i.e., down).

A NED frame is right-handed. The nadir direction of a point is defined by its astronomical latitude and astronomical longitude, respectively noted $\Phi$ and $\Lambda$. If the astronomical coordinates are replaced by the ellipsoidal latitude $\phi$ and longitude $\lambda$, the $z_l$-axis corresponds to the ellipsoidal normal, while the north direction is the tangent of the ellipsoid meridian. For the purpose of navigation, the difference between astronomical and ellipsoidal local-level frames can be neglected. The resulting frame may be referred to as an ellipsoidal tangential frame rather than a local-level frame. For purposes of the present disclosure, "local-level frame," "local frame," or "l-frame" refer to the ellipsoidal NED frame, and latitude and longitude refer to ellipsoidal quantities rather than astronomical quantities.

A body frame (b-frame) is a frame attached to the body of the UAV. The b-frame may have Cartesian coordinates $(x_b, y_b, z_b)$. The forward or longitudinal direction of the UAV may be denoted the $x_b$-axis, while the $y_b$-axis points towards right and the $z_b$-axis is downward. A rotation matrix to transform vectors from a l-frame to a b-frame is represented by Equation 1 below when Euler angles are used to express the attitude.

$$C_l^b = C_1(r)C_2(p)C_3(y) \quad \text{(Equation 1)}$$

$$= \begin{bmatrix} 1 & 0 & 0 \\ 0 & \cos r & \sin r \\ 0 & -\sin r & \cos r \end{bmatrix} \begin{bmatrix} \cos p & 0 & -\sin p \\ 0 & 1 & 0 \\ \sin p & 0 & \cos p \end{bmatrix} \begin{bmatrix} \cos y & \sin y & 0 \\ -\sin y & \cos y & 0 \\ 0 & 0 & 1 \end{bmatrix}$$

The Euler angles within Equation 1 are roll (r), pitch (p), and yaw (y). Euler angles exhibit a singularity at $p=\pi/2$, therefore alternative ways may be employed to express the attitude, such as quaternions.

Figure 3:
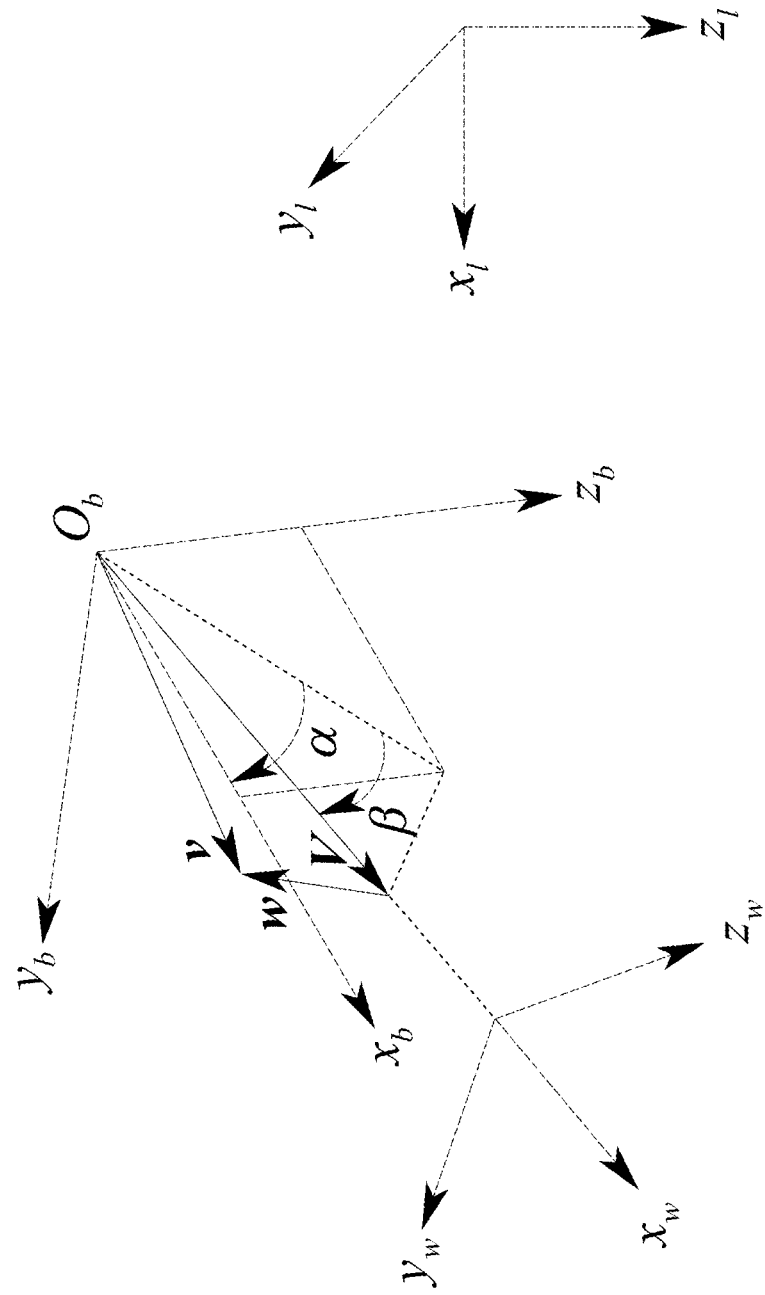
FIG. 3 illustrates a local, body, and wind navigation system frame with airspeed (V), wind velocity (w), and UAV velocity (v)

A l-frame, b-frame, and wind frame (w-frame) are described with reference to FIG. 3. An airflow, which is due to the UAV's inertial velocity v, and wind velocity w are described by an airspeed vector V. The w-frame has a first axis (i.e., $x_w$-axis) in the direction of V, and is defined by two angles with respect to the b-frame. These angles are called the angle of attack ($\alpha$) and the sideslip angle ($\beta$).

Equation 2 represents a UAV's inertial velocity and wind velocity via airspeed.

$$v = V + w \quad \text{(Equation 2)}$$

Equation 3 results when Equation 2 is applied to a body frame.

$$v^b = V^b + C_l^b w^l \Leftrightarrow \quad \text{(Equation 3)}$$

$$V^b = v^b - C_l^b w^l \Leftrightarrow \begin{bmatrix} V_x^b \\ V_y^b \\ V_z^b \end{bmatrix} = \begin{bmatrix} v_x^b \\ v_y^b \\ v_z^b \end{bmatrix} - C_l^b \begin{bmatrix} w_x^l \\ w_y^l \\ w_z^l \end{bmatrix}$$

Equation 4 represents a rotation matrix to from a body frame to a wind frame.

$$C_b^w = C_3(\beta)C_2^T(\alpha) \quad \text{(Equation 4)}$$

$$= \begin{bmatrix} \cos\beta & \sin\beta & 0 \\ -\sin\beta & \cos\beta & 0 \\ 0 & 0 & 1 \end{bmatrix} \begin{bmatrix} \cos\alpha & 0 & \sin\alpha \\ 0 & 1 & 0 \\ -\sin\alpha & 0 & \cos\alpha \end{bmatrix}.$$

Equation 5 represents the airspeed magnitude, the attack angle attack, the sideslip angle, and the dynamic pressure. The latter may be used to express aerodynamic forces and moments.

$$V = \sqrt{V_x^{b2} + V_y^{b2} + V_z^{b2}}, \; \alpha = \arctan\left(\frac{V_z^b}{V_x^b}\right), \quad \text{(Equation 5)}$$

$$\beta = \arcsin\left(\frac{V_y^b}{V}\right), \; \bar{q} = \frac{\rho V^2}{2}$$

Vehicle Dynamic Model

The Vehicle Dynamic Model (VDM) of the present disclosure is a mathematical model that describes the dynamics of motion for the UAV. In order to establish the VDM, the frames in which the dynamic states are measured and the frames in which the dynamic states are resolved should be chosen. The dynamic states include position, velocity, attitude, and rotation rate (angular velocity) vectors. There are many possibilities for these choices. However, all of them carry the same amount of information and are just different representations of the same quantity. Dynamic states are represented in Equation 6.

$$X_n = \left[r_e^{l^T}, v_e^{l^T}, q_b^{l^T}, \omega_{ib}^{b^T}\right]^T \quad \text{(Equation 6)}$$

The position vector $(r_e^l = [\phi, \lambda, h]^T)$ represents a position of the UAV (i.e., position of body frame origin) in the earth frame and in ellipsoidal coordinates. The velocity vector $(v_e^l = [v_N, v_E, v_D]^T)$ represents a velocity of the UAV as observed in the earth frame and expressed in the local (NED) frame. The $q_b^l$ quaternion $(q_b^l = [q_0, q_1, q_2, q_3]^T)$ represents an orientation of the UAV body frame with respect to the local frame. The angular velocity vector $(\omega_{ib}^b = [\omega_x, \omega_y, \omega_z]^T)$ represents an angular velocity (i.e., rotation rate) of the body frame with respect to the inertial frame, expressed in the body frame. The attitude can be represented in many different ways, such as Euler angles, rotation matrix elements, and quaternions.

The VDM can be represented by Equations 7-10.

$$\dot{r}_e^l = D^{-1} v_e^l \quad \text{(Equation 7)}$$

$$\dot{v}_e^l = C_b^l f^b + g^l - (\Omega_{el}^l + 2\Omega_{ie}^l)v_e^l = C_b^l f^b + g^l - (\Omega_{il}^l + \Omega_{ie}^l)v_e^l \quad \text{(Equation 8)}$$

$$\dot{q}_b^l = \frac{1}{2} q_b^l \otimes [\omega_{lb}^l]_q \quad \text{(Equation 9)}$$

$$\dot{\omega}_{ib}^b = (I^b)^{-1}[M^b - \Omega_{ib}^b(I^b \omega_{ib}^b)] \quad \text{(Equation 10)}$$

In Equation 7, the $D^{-1}$ matrix may be represented by Equation 11.

$$D^{-1} = \begin{bmatrix} \frac{1}{R_M + h} & 0 & 0 \\ 0 & \frac{1}{(R_p + h)\cos\phi} & 0 \\ 0 & 0 & -1 \end{bmatrix}, \quad \text{(Equation 11)}$$

$R_M$ and $R_P$ represent a meridian radius of curvature and a prime vertical radius of curvature, respectively. The meridian radius of curvature $R_M$ is represented by Equation 12 and the prime vertical radius of curvature $R_P$ is represented by Equation 13.

$$R_M = \frac{a(1-e^2)}{(1-e^2 \sin^2(\varphi))^{3/2}} \quad \text{(Equation 12)}$$

$$R_P = \frac{a}{(1-e^2 \sin^2(\varphi))^{1/2}} \quad \text{Equation 13}$$

In Equation 8, the rotation matrix $C_b^l$ can be expressed as a function of quaternion $q_b^l$, as represented by Equation 14.

$$C_b^l = f(q_b^l) = \quad \text{(Equation 14)}$$
$$\begin{bmatrix} q_0^2+q_1^2-q_2^2-q_3^2 & 2(q_1q_2-q_0q_3) & 2(q_1q_3+q_0q_2) \\ 2(q_1q_2+q_0q_3) & q_0^2-q_1^2+q_2^2-q_3^2 & 2(q_2q_3-q_0q_1) \\ 2(q_1q_3-q_0q_2) & 2(q_2q_3+q_0q_1) & q_0^2-q_1^2-q_2^2+q_3^2 \end{bmatrix}$$

Angular velocity vectors $\omega_{ie}^l$ and $\omega_{el}^l$ are represented by Equations 15 and 16 respectively, with $\omega_{il}^l$ simply being the sum of Equations 15 and 16 (i.e., $\omega_{il}^l = \omega_{ie}^l + \omega_{el}^l$).

$$\omega_{ie}^l = [\omega_{ie} \cos \phi \; 0 \; -\omega_{ie} \sin \phi]^T \quad \text{(Equation 15)}$$

$$\omega_{el}^l = [\dot{\lambda} \cos \phi \; -\dot{\phi} \; \dot{\lambda} \sin \phi]^T \quad \text{(Equation 16)}$$

The gravity vector $g^l$ of Equation 8 can be determined using a gravity model for the ellipsoidal local frame. The gravity vector $g^l$ can even be considered as a constant, depending on the application and expected accuracy.

In Equation 9, the symbol $\otimes$ represents a quaternion product, which is represented by Equation 17.

$$q = \begin{bmatrix} q_0 \\ q_1 \\ q_2 \\ q_3 \end{bmatrix}, p = \begin{bmatrix} p_0 \\ p_1 \\ p_2 \\ p_3 \end{bmatrix} \Rightarrow q \otimes p = \begin{bmatrix} q_0 p_0 - q_1 p_1 - q_2 p_2 - q_3 p_3 \\ q_0 p_1 + q_1 p_0 + q_2 p_3 - q_3 p_2 \\ q_0 p_2 + q_2 p_0 - q_1 p_3 + q_3 p_1 \\ q_0 p_3 + q_3 p_0 + q_1 p_2 - q_2 p_1 \end{bmatrix} \quad \text{(Equation 17)}$$

The Vehicle Dynamic Model (VDM) (as represented by Equations 7-10) may be used for any rigid body in arbitrary motion in ~3D space affected by Earth gravity, external specific force f, and external moment M. Completing the model for a specific type of vehicle (e.g., a fixed wing UAV) may require proper aerodynamic models for f and M, which can be a function of dynamic states, control inputs, and physical parameters of the UAV. Physical parameters can be different for each UAV.

Navigation Filter

The navigation system 108 can employ at least one of various types of estimators, such as Kalman filters, particle filters, etc. As described, the navigation system 108 includes the VDM 212 as its main model to predict navigation states of the platform. This is done, for example, by using the VDM 212 as the process model in an extended Kalman filter (EKF). As also described herein above, the VDM 212 received data from a control input (i.e., from the autopilot 202 and/or the manual control 210). It may also be beneficial to feed wind velocity data to the VDM, which can be provided by either sensory data (e.g., autonomous pressure sensors), or estimated within the navigation system 108 itself. It may further be beneficial to provide values of some physical parameters of the platform to the VDM, such as mass, moments of inertia, aerodynamic coefficients or the like. The navigation system 108 may be capable of calibrating these values online (i.e., during navigation). An adequate prior knowledge on these values can make the calibration process faster and more accurate. The navigation system 108 may fuse available sensory data with VDM prediction data to produce the final navigation solution 110.

Employing the VDM as described herein brings an extra source of information into the navigation system 108 as compared to conventional navigation methods that rely only on the autonomous sensor(s) 102 and/or environment dependent sensor(s) 104. Thus, a better navigation performance results from the teachings of the present disclosure as compared to traditional methodology. The VDM reflects physical constraints on dynamic behavior of the platform, thereby removing, to some extent, physically impossible motions suggested by sensors due to their errors.

Some auxiliary states may be estimated within the navigation system 108. While the auxiliary states may not be of interest from a navigation point of view, they may be needed for the navigation system 108 to function properly or with higher performance. Illustrative auxiliary states include wind velocity and some physical parameters of the platform, for example. Some part of the sensor errors (e.g., IMU bias terms) may be estimated within the navigation filter. Actuator(s) error is another possible auxiliary state to be estimated within the navigation filter. The estimated auxiliary states can be employed within the navigation filter to remove a portion of the sensor errors, thereby improving navigation performance.

Example: Fixed-Wing, Single Propeller UAV

The following description involves the aforementioned teachings of the present disclosure being applied to a fixed-wing UAV embodiment. For purposes of clarity only, it may be assumed that the fixed-wing UAV includes an IMU autonomous sensor 102 and a stand-alone GNSS receiver environment dependent sensor 104. Since such limitation of sensors is only for clarity, it should be appreciated that other sensors may be present, even though not explicitly described. An Extended Kalman Filter (EKF) may be in charge of data fusion for the navigation system 108 to estimate navigation states, as well as dynamic model parameters, IMU error, and wind velocity.

Aerodynamic Forces

Figure 4:
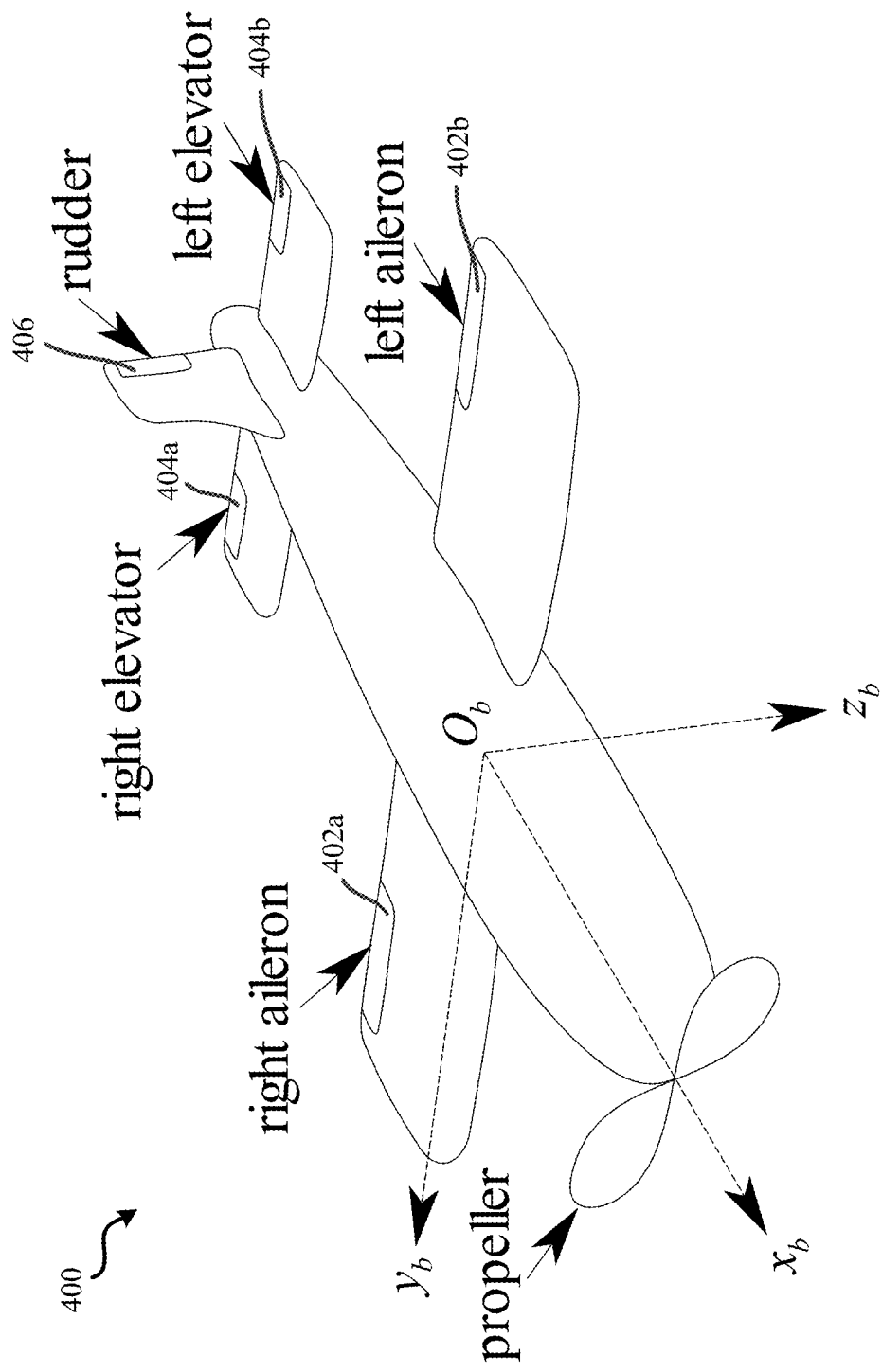
FIG. 4 illustrates a fixed-wing, single propeller UAV having aileron, elevator, and rudder control surfaces.

FIG. 4 illustrates a fixed-wing, single propeller UAV 400 having aileron 402a/402b, elevator 404a/404b, and rudder 406 control surfaces. Several aerodynamic forces are experienced by the UAV 400. A thrust force is expressed in the body frame along the $x_b$-axis while lift, lateral, and drag forces are expressed in the wind frame.

The thrust force may be represented by Equation 18, wherein ρ is the air density, n is the propeller speed, D is the propeller diameter, and $C_{F_T}$ is the thrust force derivatives for the particular UAV being used. (J) within Equation 18 is represented by Equation 19.

$$F_T = \rho n^2 D^4 C_{F_T}(J), \tag{Equation 18}$$

$$J = \frac{V}{D\pi n}, \ C_{F_T}(J) = C_{F_T 1} + C_{F_T 2} J + C_{F_T 3} J^2. \tag{Equation 19}$$

The lift force may be represented by Equation 20, wherein $\bar{q}$ is the dynamic pressure introduced in Equation 5 and S is the wing surface. $C_{F_z \ldots}$ within Equation 20 is represented by Equation 21, wherein $C_{F_z \ldots}$ the lift force derivatives for the particular UAV being used.

$$F_z^w = \bar{q} S C_{F_z}(\alpha), \tag{Equation 20}$$

$$C_{F_z}(\alpha) = C_{F_z 1} + C_{F_z \alpha} \alpha. \tag{Equation 21}$$

The lateral force may be represented by Equation 22, with $C_{F_y 1}$ of Equation 22 being represented by Equation 23, wherein $C_{F_y 1}$ is the lateral force derivatives for the particular UAV being used.

$$F_y^w = \bar{q} S C_{F_y}(\beta), \tag{Equation 22}$$

$$C_{F_y}(\beta) = C_{F_y 1} \beta. \tag{Equation 23}$$

The drag force may be represented by Equation 24, with $C_{F_x \ldots}$ of Equation 24 being represented by Equation 25, wherein $C_{F_x \ldots}$ is the drag force derivatives for the particular UAV being used.

$$F_x^w = \bar{q} S C_{F_x}(\alpha, \beta), \tag{Equation 24}$$

$$C_{F_x}(\alpha, \beta) = C_{F_x 1} + C_{F_x \alpha} \alpha + C_{F_x \alpha 2} \alpha^2 + C_{F_x \beta 2} \beta^2. \tag{Equation 25}$$

The specific force vector f, represented by Equation 26 below, is composed of these four components (i.e., the thrust force, lift force, lateral force, and drag force) divided by the mass of the UAV being used.

$$f^b = \frac{1}{m}\left(\begin{bmatrix} F_T \\ 0 \\ 0 \end{bmatrix} + C_w^b \begin{bmatrix} F_x^w \\ F_y^w \\ F_z^w \end{bmatrix}\right) \tag{Equation 26}$$

Aerodynamic Moments

In addition to aerodynamic forces, three components of aerodynamic moments are also recognizable in the VDM of the present disclosure. These components of aerodynamic moments include a roll moment, pitch moment, and yaw moment.

The roll moment is represented by Equation 27, wherein b is the wing span of the UAV being used. $\tilde{\omega}_x$ within Equation 27 is represented by Equation 28. $C_{M_x \ldots}$ within Equation 28 is represented by Equation 29, wherein $C_{M_x \ldots}$ the roll moment derivatives for the particular UAV being used.

$$M_x^b = \bar{q} S b C_{M_x}(\delta_a, \beta, \tilde{\omega}_x, \tilde{\omega}_z), \tag{Equation 27}$$

$$\tilde{\omega}_x = \frac{b \omega_x}{2V}, \ \tilde{\omega}_y = \frac{\bar{c} \omega_y}{2V}, \ \tilde{\omega}_z = \frac{b \omega_z}{2V}, \tag{Equation 28}$$

$$C_{M_x}(\delta_a, \beta, \tilde{\omega}_x, \tilde{\omega}_z) = \tag{Equation 29}$$
$$C_{M_x a} \delta_a + C_{M_x \beta} \beta + C_{M_x \tilde{\omega}_x} \tilde{\omega}_x + C_{M_x \tilde{\omega}_z} \tilde{\omega}_z.$$

The Pitch moment is represented by Equation 30, wherein $\bar{c}$ is the mean aerodynamic chord. $C_{M_y \ldots}$ within Equation 30 is represented by Equation 31, wherein $C_{M_y \ldots}$ is the pitch moment derivatives for the particular UAV being used.

$$M_y^b = \bar{q} S \bar{c} C_{M_y}(\delta_e, \alpha, \tilde{\omega}_y), \tag{Equation 30}$$

$$C_{M_y}(\delta_e, \alpha, \tilde{\omega}_y) = C_{M_y 1} + C_{M_y e} \delta_e + C_{M_y \tilde{\omega}_y} \tilde{\omega}_y + C_{M_y \alpha} \alpha. \tag{Equation 31}$$

The Yaw moment is represented by Equation 32. $C_{M_z \ldots}$ within Equation 32 is represented by Equation 33, wherein $C_{M_z \ldots}$ is the yaw moment derivatives for the particular UAV being used.

$$M_z^b = \bar{q} S b C_{M_z}(\delta_r, \tilde{\omega}_z, \beta), \tag{Equation 32}$$

$$C_{M_z}(\delta_r, \tilde{\omega}_z, \beta) = C_{M_z \delta_r} \delta_r + C_{M_z \tilde{\omega}_z} \tilde{\omega}_z + C_{M_z \beta} \beta. \tag{Equation 33}$$

A moments vector M is composed of these three components (i.e., the roll moment, the pitch moment, and the yaw moment), and is represented by Equation 34.

$$M^b = \begin{bmatrix} M_x^b \\ M_y^b \\ M_z^b \end{bmatrix} \tag{Equation 34}$$

Equations 7-10 together with Equations 26-34 form the VDM for the sample fixed-wing, single propeller UAV 400 of FIG. 4. If the dynamic of the actuators is also available and intended to be considered within the navigation platform, it can be considered as a part of the VDM. In this case, for example, the rotation speed of the propeller is modeled by a first order linear differential equation, such as that represented by Equation 35. This equation may be considered as the last part of the VDM.

$$\dot{n} = -\frac{1}{\tau_n} n + \frac{1}{\tau_n} n_c \tag{Equation 35}$$

Air Density Model

Depending on accuracy requirements and fidelity of modeling, the air density may be considered as a constant or as a function of local pressure and temperature according to a suitable model for the particular UAV being used. Local pressure and temperature can be expressed as functions of the altitude. According to the International Standard Atmosphere model for low altitude, for example, the air density can be represented by Equation 36.

$$\rho = \frac{p_0[1 + ah/T_0]^{4.2561}}{R_a T_0} \tag{Equation 36}$$

Navigation System

Figure 5:
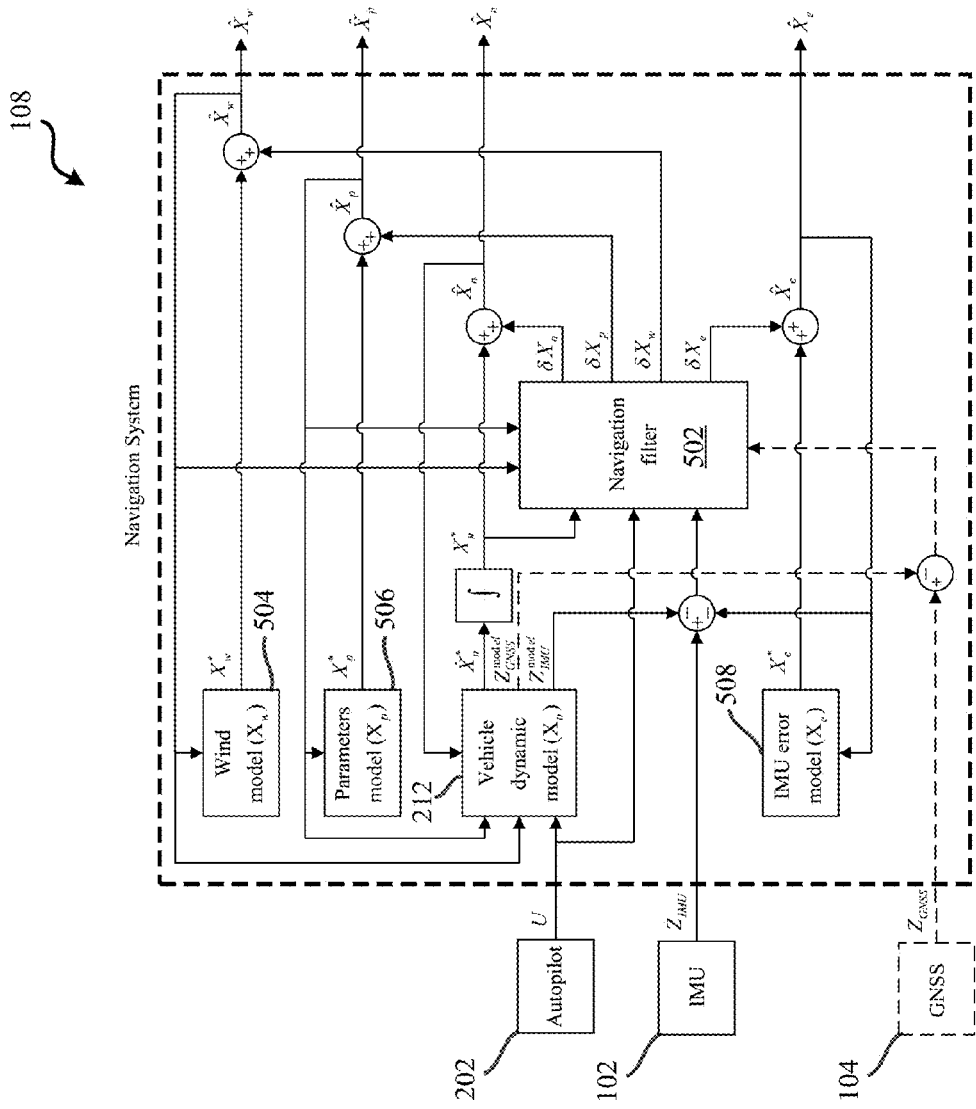
FIG. 5 illustrates a navigation system architecture according to the present disclosure.

An extended Kalman filter may be chosen to serve as the navigation filter implemented within the navigation system 108. The navigation system 108 of the present disclosure utilizes the VDM 212 as the main process model within a differential navigation filter. As illustrated in FIG. 5, the VDM 212 provides the navigation solution 110, which is updated by the navigation filter 502 based on available measurements. Hence, autonomous IMU sensor 102 data is treated as a measurement within the navigation filter 502, just as environment dependent GNSS receiver 104 observations are, when available. Autonomous IMU sensor 102 observations are related to system states via the VDM 212.

Any other available sensory data, such as altimeter or magnetometer output, can also be integrated within the navigation filter 502 as an additional measurement. The VDM 212 is fed with the control input of the UAV, which is commanded by the autopilot 202. Another beneficial input is the wind velocity, which can be estimated by either airspeed sensors or within the navigation system 108 with no additional sensors needed. The latter approach is described herein through use of a wind model 504. The parameters of the VDM 212, which may be similar to the physical properties of the UAV, may be required within the navigation filter 502. These parameters may be pre-calibrated as fixed values. Alternatively, to increase the flexibility as well as the accuracy of the teachings of the present disclosure while minimizing the design effort, an online (i.e., during navigation) parameter estimation/refinement may be used. Calibration of such parameters may involve the parameters model 506. Autonomous IMU sensor 102 errors may also be modeled and estimated within the navigation system 108 as additional filter states.

State Space Augmentation

Referring to FIG. 5, the navigation filter 502 (e.g., an EKF) may be used to estimate parameters or variables in addition to the navigation states. An augmented state vector may include navigation states ($X_n$) (generated by the VDM 212), UAV dynamic model parameters ($X_p$) (generated by a parameters model 506), IMU error terms ($X_e$) generated by an IMU error model 508), and wind velocity components ($X_w$) (generated by a wind model 504). For each of these augmentation parts, a process model may be needed. The process model may be dynamic ($\dot{X} \neq 0$) in general, but it can be static ($\dot{X}=0$) if a constant variable is being estimated within the navigation filter 502.

The parameters used in the VDM 212 reflect the physical properties of the UAV. The parameters are typically constant, or change very slowly. However, the parameters' constant values may not be known initially (e.g., for a new UAV) with sufficient certainty. A static model may be used for the parameters within the navigation filter 502. The parameters vector related to the VDM contains most of the parameters used in the overall UAV dynamic modeling. The parameters used in the VDM, but not included in the augmented states, are related to the environment rather than the platform, which are known with a sufficient level of certainty. Gravity acceleration is an example of one of those parameters. Also, the mass and the moments of inertia of the UAV are not included in this vector, since they appear as scaling factors in the equations of motion and therefore they are completely correlated with the already included coefficients of aerodynamic forces and moments. The dynamic model parameters are ordered in a 26×1 vector and associated with a static process model as represented by Equations 37 and 38.

$$X_p = \begin{bmatrix} S, & \bar{c}, & b, & D, & C_{F_T1}, & C_{F_T2}, & C_{F_T3}, & C_{F_z1}, & C_{F_z\alpha}, & C_{F_x1}, & \ldots \\ \ldots & C_{F_x\alpha}, & C_{F_x\alpha2}, & C_{F_x\beta2}, & C_{F_y1}, & C_{M_x\alpha}, & C_{M_x\beta}, & C_{M_x\bar{\omega}_x}, & C_{M_x\bar{\omega}_z}, & C_{M_y1}, & C_{M_y e}, & \ldots \\ \ldots & C_{M_y\alpha}, & C_{M_y\bar{\omega}_y}, & C_{M_z\delta_r}, & C_{M_z\beta}, & C_{M_z\bar{\omega}_z} & \tau_n & & & & & \end{bmatrix}^T$$

(Equation 37)

$$\dot{X}_p = [0]_{26 \times 1}.$$ (Equation 38)

White noise is not considered for purposes of this disclosure, due to the fact that the parameters are expected to be constant over time, hence the static model holds with high certainty. However, since the initial values of the parameters generally have imperfections, an initial uncertainty is considered for them.

The error in each accelerometer or gyroscope inside the autonomous IMU sensor 102 may be modeled as a random walk ($b_{rw}$ ···) process. Therefore, an IMU error terms vector may be represented by Equation 39, wherein the ai and gi superscripts denote the i-th accelerometer and gyroscope, respectively. The process model for $X_e$ is a linear dynamic model by definition and contains only white noise, as represented by Equation 40. $G_{ee}$ within Equation 40 may be represented by Equation 41. Moreover, $W_e$ within Equation 40 may be represented by Equation 42. This model is sufficient for a low-cost IMU, but can be extended as needed.

$$X_e = [b_{rw}^{a1}, b_{rw}^{a2}, b_{rw}^{a3}, b_{rw}^{g1}, b_{rw}^{g2}, b_{rw}^{g3}]^T,$$ (Equation 39)

$$\dot{X}_e = G_{ee} W_e,$$ (Equation 40)

$$G_{ee} = [I]_{6 \times 6},$$ (Equation 41)

$$W_e = [\sigma_{b_{rw}^{a1}}, \sigma_{b_{rw}^{a2}}, \sigma_{b_{rw}^{a3}}, \sigma_{b_{rw}^{g1}}, \sigma_{b_{rw}^{g2}}, \sigma_{b_{rw}^{g3}}]^T.$$ (Equation 42)

The wind velocity, represented by Equation 43, may be stated as a vector in the local (navigation) frame consisting of the three components of wind velocity in the north, east, and down directions. While in usual cases wind velocity is expected to change slowly and smoothly from one moment to another, in general there is no information on such transition. Therefore, no deterministic part is considered in the process model of the present disclosure with respect to wind velocity, and only a white noise is assumed to rule the transition in time. Thus, the process model may be represented by Equation 44. $G_{ww}$ within Equation 44 may be represented by Equation 45. Moreover, $W_w$ within Equation 44 may be represented by Equation 46.

$$X_w = [w_x^I, w_y^I, w_z^I]^T \quad \text{(Equation 43)}$$

$$\dot{X}_w = G_{ww}W_w, \quad \text{(Equation 44)}$$

$$G_{ww} = \begin{bmatrix} 1 & 0 & 0 \\ 0 & 1 & 0 \\ 0 & 0 & 1 \end{bmatrix}, \quad \text{(Equation 45)}$$

$$W_w = \left[\sigma_{w_x^I}, \sigma_{w_y^I}, \sigma_{w_y^I}\right]^T. \quad \text{(Equation 46)}$$

Process Models Linearization

Process models should be linearized to provide the dynamic matrices used in the EKF. In the most general case, the augmented state vector may be represented by Equation 47. Process models for all sub-state vectors of the augmented state vector have been presented herein above. The linearized model as represented by Equation 48 is equivalent to Equation 49.

$$X = [X_n^T, X_p^T, X_e^T, X_w^T]^T, \quad \text{(Equation 47)}$$

$$\dot{X} = FX + GW, \quad \text{(Equation 48)}$$

$$\begin{bmatrix} \dot{X}_n \\ \dot{X}_p \\ \dot{X}_e \\ \dot{X}_w \end{bmatrix} = \begin{bmatrix} F_{nn} & F_{np} & F_{ne} & F_{nw} \\ F_{pn} & F_{pp} & F_{pe} & F_{pw} \\ F_{en} & F_{ep} & F_{ee} & F_{ew} \\ F_{wn} & F_{wp} & F_{we} & F_{ww} \end{bmatrix} \begin{bmatrix} X_n \\ X_p \\ X_e \\ X_w \end{bmatrix} + \begin{bmatrix} G_{nn} & 0 & 0 & 0 \\ 0 & G_{pp} & 0 & 0 \\ 0 & 0 & G_{ee} & 0 \\ 0 & 0 & 0 & G_{ww} \end{bmatrix} \begin{bmatrix} W_n \\ W_p \\ W_e \\ W_w \end{bmatrix}. \quad \text{(Equation 49)}$$

Linearizing each of the process models with respect to all state vectors, results in the determination of the corresponding row of F matrix being represented by Equation 50. Equation 50 may be evaluated either analytically or numerically. While analytical calculation is tedious (i.e., leads to very long equations for many elements), it may be desirable due to its accuracy, numerical stability, and computational efficiency.

$$F_{ij} = \frac{\partial \dot{X}_i}{\partial X_j}, \quad \text{(Equation 50)}$$

To determine the G matrix and W vector, proper uncertainty quantization should to be defined. This is beneficial, for example, when the uncertainty quantization it is not already included explicitly in the model. Assuming the sub-state vectors $X_n$, $X_p$, $X_e$, and $X_w$ are uncorrelated, the off-diagonal blocks in the G matrix are all zero. Examining Equations 7-10 reveals that Equations 7 and 9 are purely kinematic equations (i.e., they are error-free). Therefore, the uncertainty terms apply only on linear and rotational accelerations of the UAV. The propeller speed is also added to the end of the $X_n$ vector, so the uncertainty on the dynamic model also appears in $W_n$. Hence, $W_n$ may be represented by Equation 51. Additionally, $G_{nn}$ may thus be represented by Equation 52.

$$W_n = \left[\sigma_{\dot{v}_N}, \sigma_{\dot{v}_E}, \sigma_{\dot{v}_D}, \sigma_{\dot{\omega}_x}, \sigma_{\dot{\omega}_y}, \sigma_{\dot{\omega}_z}, \sigma_{\dot{n}}\right]^T, \quad \text{(Equation 51)}$$

$$G_{nn} = \begin{bmatrix} 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 1 & 0 & 0 & 0 & 0 & 0 & 0 \\ 0 & 1 & 0 & 0 & 0 & 0 & 0 \\ 0 & 0 & 1 & 0 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 0 & 1 & 0 & 0 & 0 \\ 0 & 0 & 0 & 0 & 1 & 0 & 0 \\ 0 & 0 & 0 & 0 & 0 & 1 & 0 \\ 0 & 0 & 0 & 0 & 0 & 0 & 1 \end{bmatrix}. \quad \text{(Equation 52)}$$

By modeling the dynamic model parameters as constants in Equation 38, the $G_{pp}$ matrix and $W_{pp}$ vector are both empty (as represented by Equations 53 and 54).

$$G_{pp} = [\ ] \quad \text{(Equation 53)}$$

$$W_p = [\ ] \quad \text{(Equation 54)}$$

As seen in Equation 40, the process model for IMU error terms is a linear model. Therefore, the $G_{ee}$ matrix and $W_e$ vector are the same ones as in Equations 41 and 42, respectively.

The process model for wind velocity components is also a linear model, as represented in Equation 44. Therefore, the $G_{ww}$ matrix and $W_w$ vector are also the same ones seen in Equations 45 and 46, respectively.

Observation Models Linearization

The linearized observation model may be derived from IMU 102 and GNSS 104 position measurements. When both IMU 102 and GNSS 104 measurements are available, the measurement vector Z may be represented by Equation 55. The linearized measurement model of vector Z may be represented by Equation 56, wherein r is the measurement noise vector with covariance matrix R. H within Equation 56 may be represented by the matrix of Equation 57.

$$Z = [Z_{IMU} Z_{GNSS}]^T n \quad \text{(Equation 55)}$$

$$Z = HX + r, \quad \text{(Equation 56)}$$

$$H = \frac{\partial Z}{\partial X} = \quad \text{(Equation 57)}$$

$$\frac{\partial [Z_{IMU} Z_{GNSS}]^T}{\partial [X_n X_p X_e X_w]^T} = \begin{bmatrix} H_{IMU,n} & H_{IMU,p} & H_{IMU,e} & H_{IMU,w} \\ H_{GNSS,n} & H_{GNSS,p} & H_{GNSS,e} & H_{GNSS,w} \end{bmatrix}$$

The first row of the H matrix is derived using the IMU measurement equation (i.e., Equation 58). The IMU measures specific force components and rotation rates and includes IMU error terms.

$$Z_{IMU} = \begin{bmatrix} f^b \\ \omega_{ib}^b \end{bmatrix} + X_e. \quad \text{(Equation 58)}$$

The second row of the H matrix is derived using the GNSS position observations in 3-D space, and is represented by Equation 59. If the GNSS position observations are completed with the velocity observations, the $Z_{GNSS}$ vector of Equation 59 may be extended to include the velocity observations.

$$Z_{GNSS} = \begin{bmatrix} \phi \\ \lambda \\ h \end{bmatrix}. \quad \text{(Equation 59)}$$

Hardware

The UAV tested using the teachings herein was a custom made UAV equipped with the open-source autopilot PIXHAWK® equipped with a time-stamping module. The maximum payload capacity was around 800 g, and the operational weight varied around 2500 g. Flying endurance was around 45 minutes. Thanks to its lightweight construction, the launching could be done from hand and it required only a small place for landing. The navigation sensors used included a micro-electro-mechanical system (MEMS) IMU called NavChip from INTERSENSE®, and a standalone GNSS receiver inside the PIXHAWK® autopilot. A geodetic grade GNSS receiver called Alpha from JAVAD® was also on the UAV, working in real time kinematic (RTK) mode and providing the reference for evaluating the navigation solution 110. The sampling frequencies were 100 Hz for the IMU 102 and 1 Hz for the standalone GNSS receiver 104.

Sample Results

The below description provides some simulation and experimental results as an example to show the performance of the navigation system of the present disclosure. The position results are presented in a Cartesian East, North, Up (ENU) frame and the attitude results are presented in Euler angles form (i.e., roll, pitch, and yaw).

Figure 6:
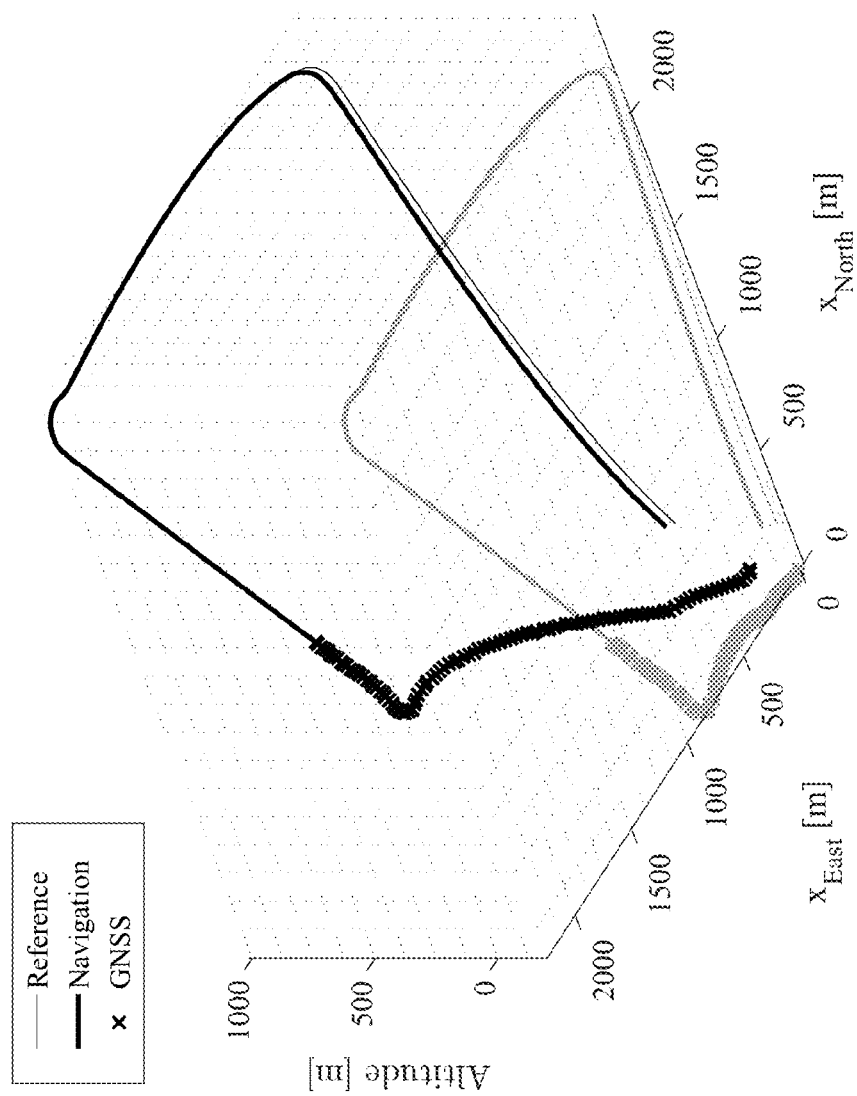
FIG. 6 illustrates a reference trajectory and a navigation solution from a sample run with GNSS signals available during the first 100 seconds of flight in a Monte Carlo simulation.

A Monte Carlo simulation was performed with 100 runs, using real 3D wind velocity data. While the trajectory and the wind was kept the same in each realization, the error in observations, initialization, and VDM parameters changed randomly for each individual run. FIG. 6 illustrates the reference trajectory, as well as the navigation solution from a sample run. The trajectory had a footprint bigger than 2 km×2 km on the ground and a 1 km change in altitude.

For purposes of the following description, sensor errors were modeled and added to nominal measurements. The exact values of model parameters used in simulating real sensors (i.e., the stochastic parameters) were unknown to the navigation system (i.e., the EKF), similar to real flight situations.

IMU error for each accelerometer and gyroscope may be represented as the sum of a bias, a white noise, and a first order Gauss-Markov process. The numerical values of the model parameters corresponding to low-cost MEMS inertial sensors are provided in Table 1 below. The IMU sampling frequency was 100 Hz.

TABLE 1

MEMS IMU error model parameters

| Error type | | Parameter | Value | Unit |
|---|---|---|---|---|
| Accelerometers | Bias | σ | 8 | mg |
| | White Noise | σ | 50 | μg/$\sqrt{Hz}$ |
| | 1$^{st}$ order Gauss-Markov | σ | 0.05 | mg |
| | | T | 200 | s |
| Gyroscopes | Bias | σ | 720 | °/hr |
| | White Noise | σ | 0.003 | °/s/$\sqrt{Hz}$ |
| | 1$^{st}$ order Gauss-Markov | σ | 10 | °/hr |
| | | T | 200 | s |

GNSS error is modeled as independent white noise signals for each channel (north, east, down). The standard deviation of the white noise is considered 1 m and the sampling frequency was 1 Hz.

To start the filtering process, the initial values for all the states were required. These values normally contain some errors. The following paragraphs describe the initial errors and the initial uncertainties that were considered in simulations or within the designed EKF.

For the navigation states ($X_n$), the considered errors reflect the initialization error of the navigation system. An error of 1 m was considered for each component of the position, and the errors considered for the north, east, and down components of the velocity were 1 m/s, 0.2 m/s, and 0.5 m/s, respectively. The initial alignment error was considered to be 3° for roll and pitch and 5° for yaw, while an error of 1°/s was assumed for roll, pitch, and yaw rates. An error of 15 rad/s was also considered for the propeller speed. The initial uncertainties in the state covariance matrix P were in the range from 1 to 2 times the initial errors described herein. Simulations revealed little sensitivity to the selection of these values.

The errors considered for the VDM parameters ($X_p$) were randomly distributed percentages of the real values with a standard deviation of 10%. The initial uncertainties were set in the range of the mentioned initial errors, and again, simulations showed little sensitivity to reasonable changes in these values.

The initial values for the IMU error states ($X_e$) were set to zero. The initial uncertainties were in general agreement with the IMU specifications used in the simulations, with a minor scaling with respect to the values used in simulating sensor errors, in order to preserve an approach close to reality, where even the exact error statistics of the sensors may not be known. Simulations verified little sensitivity to reasonable changes in these values.

The initial values for wind velocity components ($X_w$) were also set to zero, with an initial uncertainty of 1.5 m/s for each component. The airspeed sensor that may be on board of many (if not all) UAVs was not considered in the investigations described herein in order to further explore the capabilities of the navigation filter and avoid adding additional sensors to the minimal setup of an INS/GNSS system.

Generally, a Kalman filter is provided with uncertainty values that reflect imperfections in modeling and observations. These uncertainties are discussed in the following paragraphs.

The process model uncertainty is reflected in the GW term in Equations 48 and 49. Vector W contains white noise as the source of uncertainty in the process model, while matrix G is the noise shaping matrix. The four parts of W, namely and $W_n$, $W_p$, $W_e$, and $W_w$ are represented in Equations 51, 54, 42, and 46, respectively. In $W_n$, the value of $10^{-4}$ was considered for the standard deviation of all terms. The small value of $W_p$ standard deviations does not necessarily mean a high confidence in the VDM, because the major portion of the uncertainty of the model is reflected in the initial uncertainty of the VDM parameters. However, when implementing the algorithm in a real scenario, a higher uncertainty may be needed. This is because there are always some unmodeled dynamics and disturbances that contribute to the deviation of model from reality, and these need to be accounted for in the error propagation. The process model for the VDM parameters as described herein is a static model with no uncertainty on the parameters being constant, so $W_p$ contains no value. The values of $W_e$ standard deviations were in general agreement with the IMU specifications used in the simulations. A standard deviation of 0.1 m/s² was considered for each component of the wind velocity noise vector $W_w$, to allow capturing moderate changes in wind velocity.

The noise vector r in Equation 56 reflects the measurement uncertainty. The variance values for IMU measurements in the covariance matrix R were considered within the range of the IMU error statistics, neglecting the bias terms. This is because the estimated bias terms were directly subtracted from the IMU measurements before being fed to the EKF. For each channel of the GNSS measurements, the variance term in the covariance matrix was considered in the range of the error statistics of the device.

Figure 7:
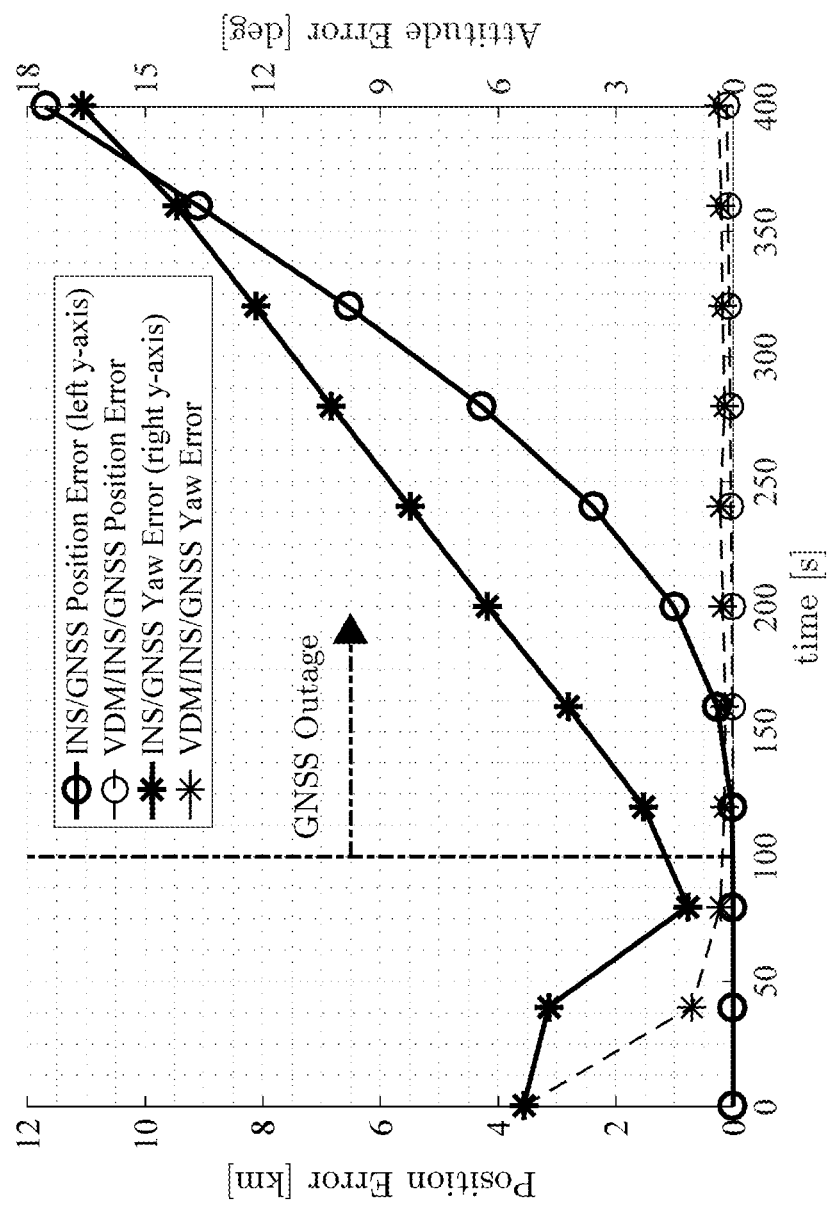
FIG. 7 illustrates a comparison between INS/GNSS and VDM/INS/GNSS with Root Mean Squared (RMS) position and yaw errors from 100 Monte Carlo runs.

FIG. 7 illustrates a comparison of the root mean square (RMS) of position and yaw errors for all the 100 Monte Carlo runs between the VDM/INS/GNSS approach described herein and a traditional INS/GNSS navigation algorithm over the whole interval. While the RMS of position error was 11.7 km for classical INS coasting after ~5 minutes of autonomous navigation during GNSS outage, this was reduced to less than 110 m with the proposed VDM/INS/GNSS navigation platform under the exact same situations. That is, an improvement of two orders of magnitude in position accuracy was achieved through use of the herein disclosed navigation platform. The attitude determination also showed an improvement of 1 to 2 orders of magnitude. The improved performance of the navigation filter disclosed herein is also noticeable during the availability of GNSS in estimating yaw.

Figure 8:
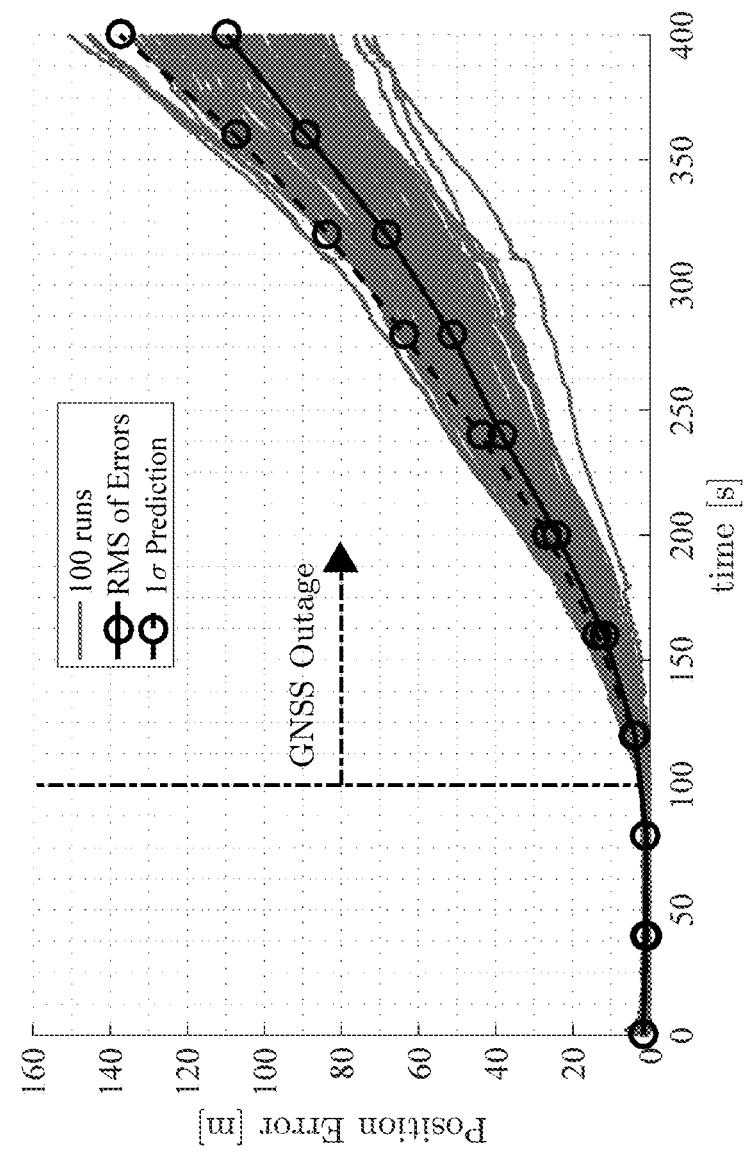
FIG. 8 illustrates position errors for 100 Monte Carlo runs.

The position error for all the 100 Monte Carlo runs is illustrated in FIG. 8. FIG. 8 illustrates how the error grew as time passed after GNSS outage started, and how the overall behavior was similar for individual runs. An empirical RMS was calculated from these individual errors and plotted against the predicted confidence level (1σ). Correctness of the navigation filter setup is demonstrated by how closely (and slightly conservatively) the error was predicted within the navigation filter.

Figure 9:
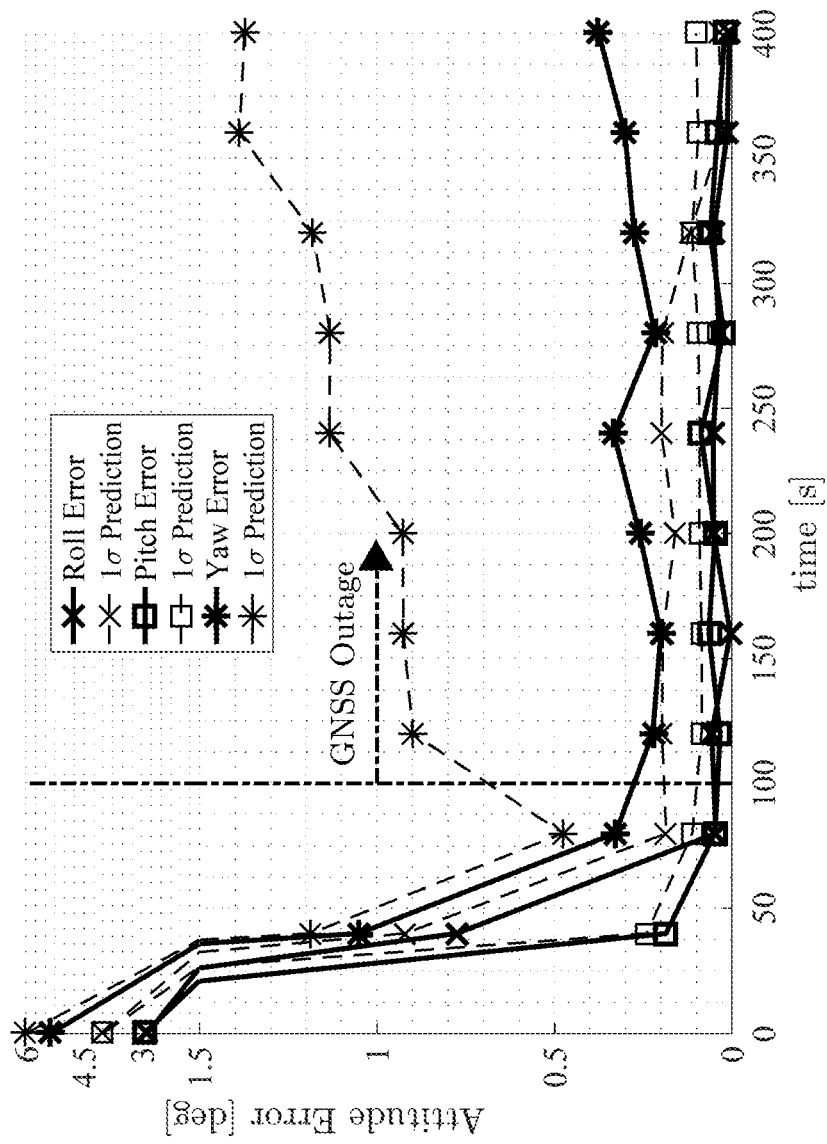
FIG. 9 illustrates the RMS of attitude errors from 100 Monte Carlo runs.

FIG. 9 illustrates an empirical RMS of attitude errors for all the 100 Monte Carlo runs, with associated predicted values of confidence (1σ). The results were satisfactory in terms of preserved navigation accuracy, with the RMS of error being only 0.0072° for roll, 0.020° for pitch, and 0.38° for yaw after ~5 minutes of autonomous navigation during GNSS outage. In comparison, traditional INS coasting resulted in errors of 2.6° for roll, 1.5° for pitch, and 16.6° for yaw under the exact same conditions.

Figure 10A:
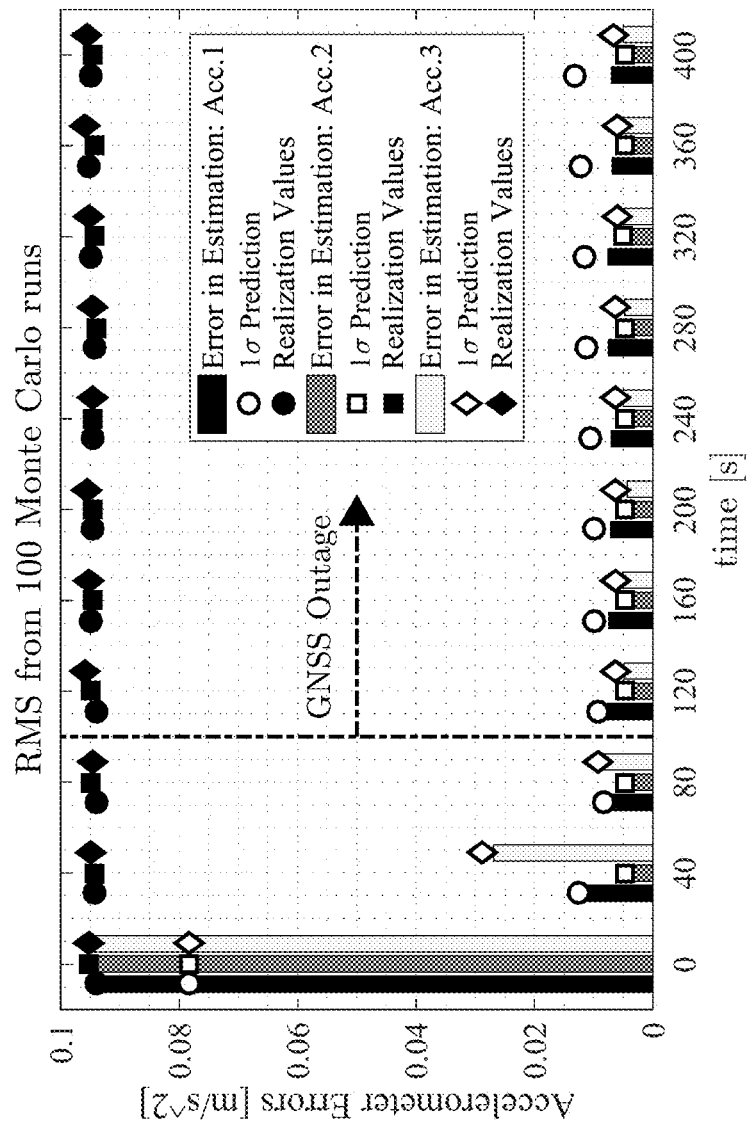
FIGS. 10A and 10B illustrate the RMS of estimation error for IMU error terms from 100 Monte Carlo runs, together with the amplitude of simulated errors (realization values)
Figure 10B:
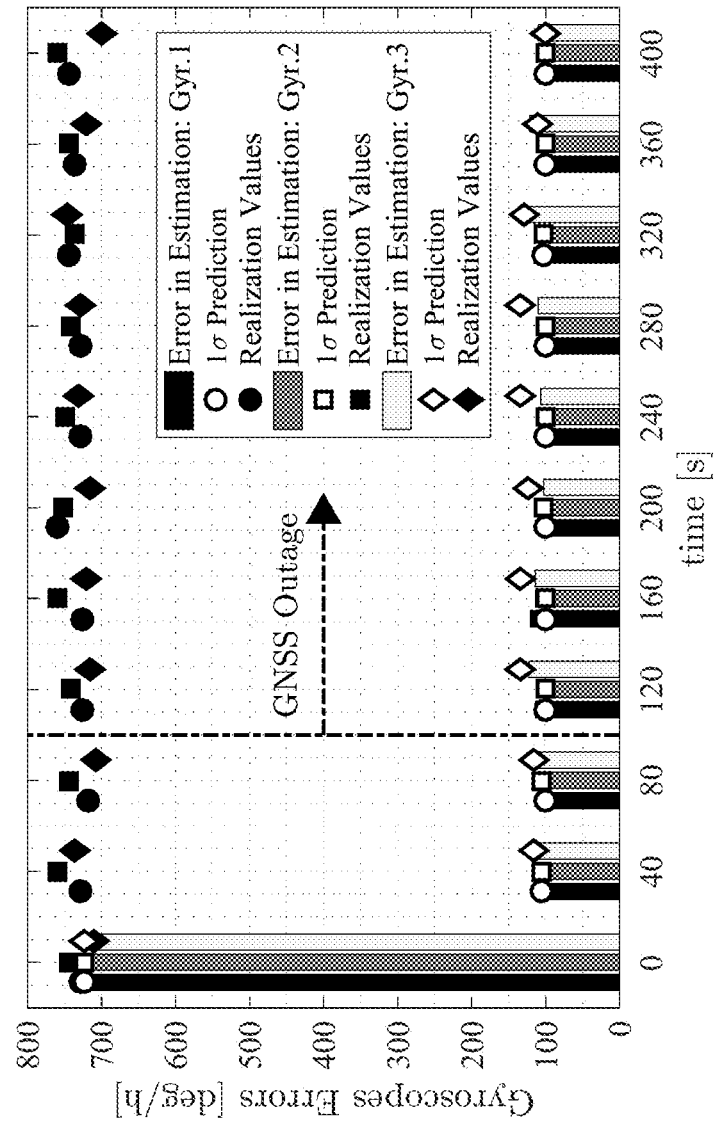

FIGS. 10A and 10B illustrate the empirical RMS of errors in estimation of IMU error terms for all the 100 Monte Carlo runs. The predicted confidence values (1σ) were again very close to empirical RMS, and the accuracy of the estimation was satisfactory in comparison to the amplitude of simulated errors plotted on the same graph.

Figure 11:
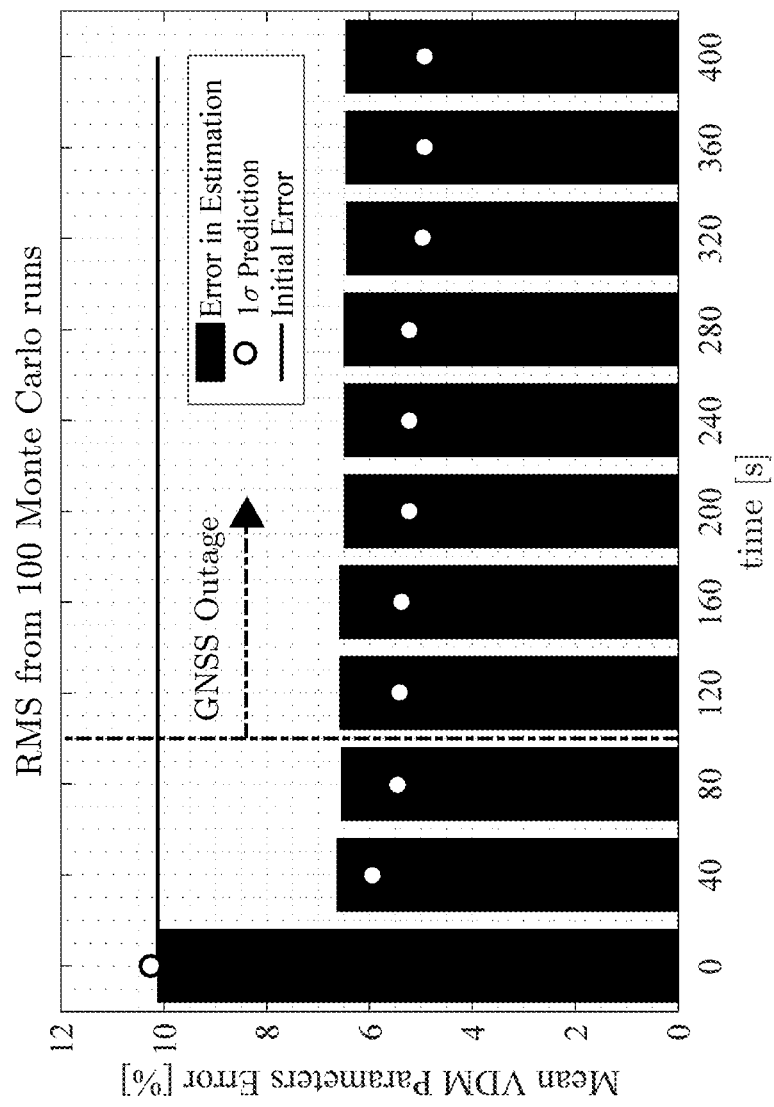
FIG. 11 illustrates the RMS of estimation error for VDM parameters from 100 Monte Carlo runs.

The empirical RMS of mean error in estimation of VDM parameters for all the 100 Monte Carlo runs was plotted, as illustrated in FIG. 11. As FIG. 11 shows, the navigation filter was slightly optimistic in predicting the accuracy of estimation, but the difference did not exceed 24%. The evolution of this error reveals that there was a sharp decrease in the mean error of parameter estimation from the initial 10% error to 6% during the first 40 seconds with GNSS available, which was followed by a slowly decreasing trend. The reason behind the second regime is the correlation between some parameters within the set. In such situations, groups of parameters are estimated better than individual parameters, and individual errors contribute to increasing the mean error for the whole set. The mean error was calculated in an RMS sense for all the parameters at any given time to be stricter and to cover both the mean value and the standard deviation.

Figure 12:
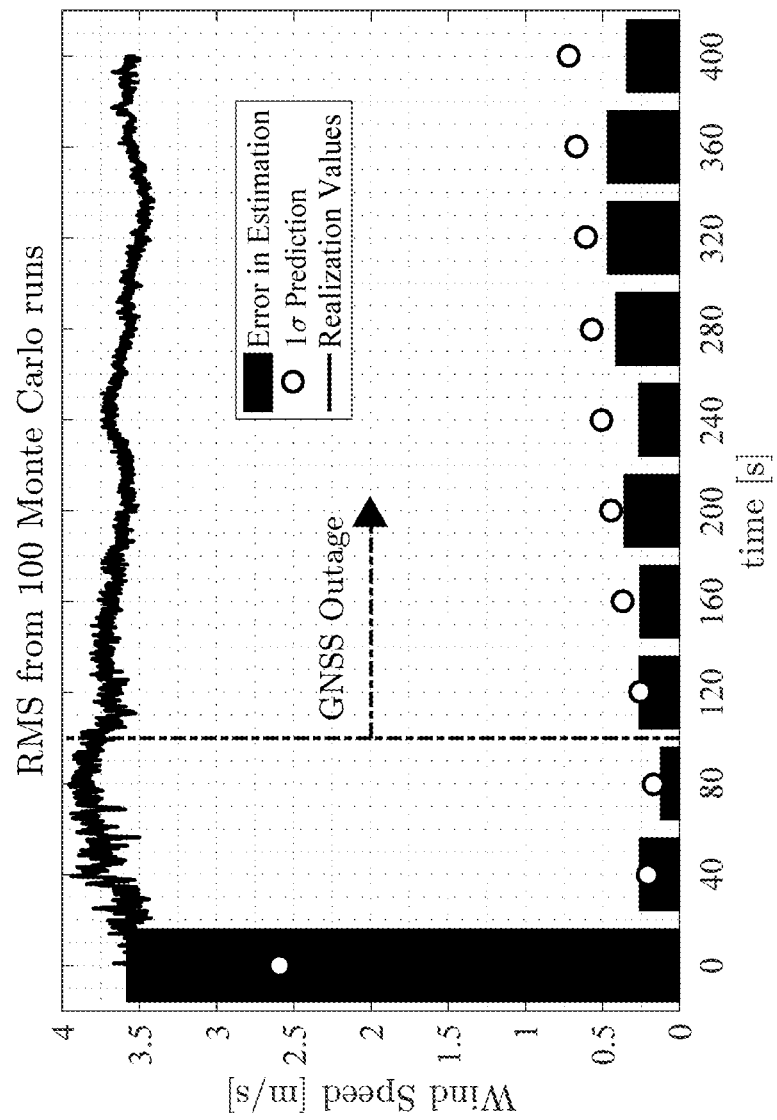
FIG. 12 illustrates the RMS of estimation error for wind speed from 100 Monte Carlo runs, together with real wind speed (realization value)

The RMS of error in estimation of wind speed for all the 100 Monte Carlo runs is illustrated in FIG. 12. Again, the navigation filter was able to provide a close and slightly conservative prediction on the estimation error, and the accuracy of the estimation is satisfactory for navigation purposes, especially considering that no airspeed sensor was considered in the navigation platform, so the estimation was provided simply as a courtesy of the VDM. There were no measurements on the air speed considered within the navigation filter, although they are available on most (if not all) UAVs, and will of course improve the estimation. As revealed by the slow growth of predicted error, the wind speed estimation accuracy was expected to decrease as time passed during GNSS outage. However, the rate of this growth was very well controlled, reaching only 0.7 m/s after ~5 minutes of GNSS outage. All three components of the wind velocity were estimated within the navigation filter, which were converted to the wind speed when presenting results in favor of the plot being more comprehensive.

Below, some aspects of the observability of navigation filter states are discussed. The discussion is based on an analysis of a covariance matrix throughout time. The close agreement between the empirical errors and the predicted confidence levels through the covariance matrix provides validity of stochastic parameters. Although the FIGS. discussed below are related to a single sample Monte Carlo run, the results were similar for all the 100 Monte Carlo runs.

Figure 13A:
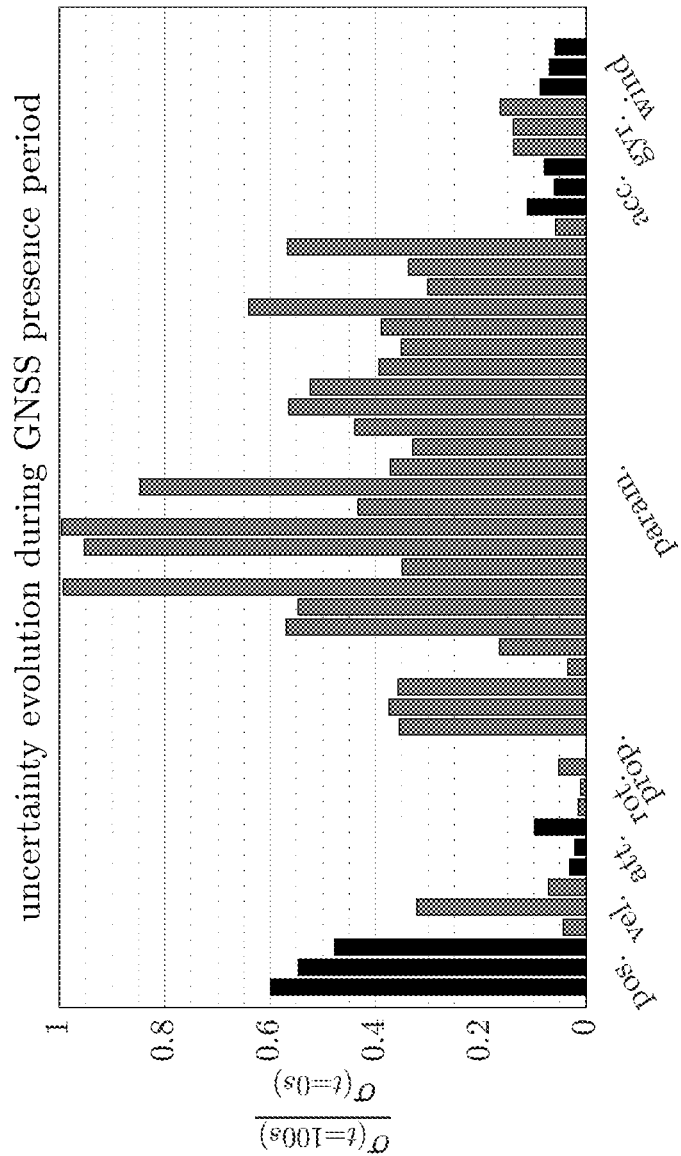
FIGS. 13A and 13B illustrate ratios of uncertainties on states during GNSS presence and GNSS outage periods (navigation starts with GNSS available at t=0, GNSS outage begins at t=100 s, and navigation ends at t=400 s)
Figure 13B:
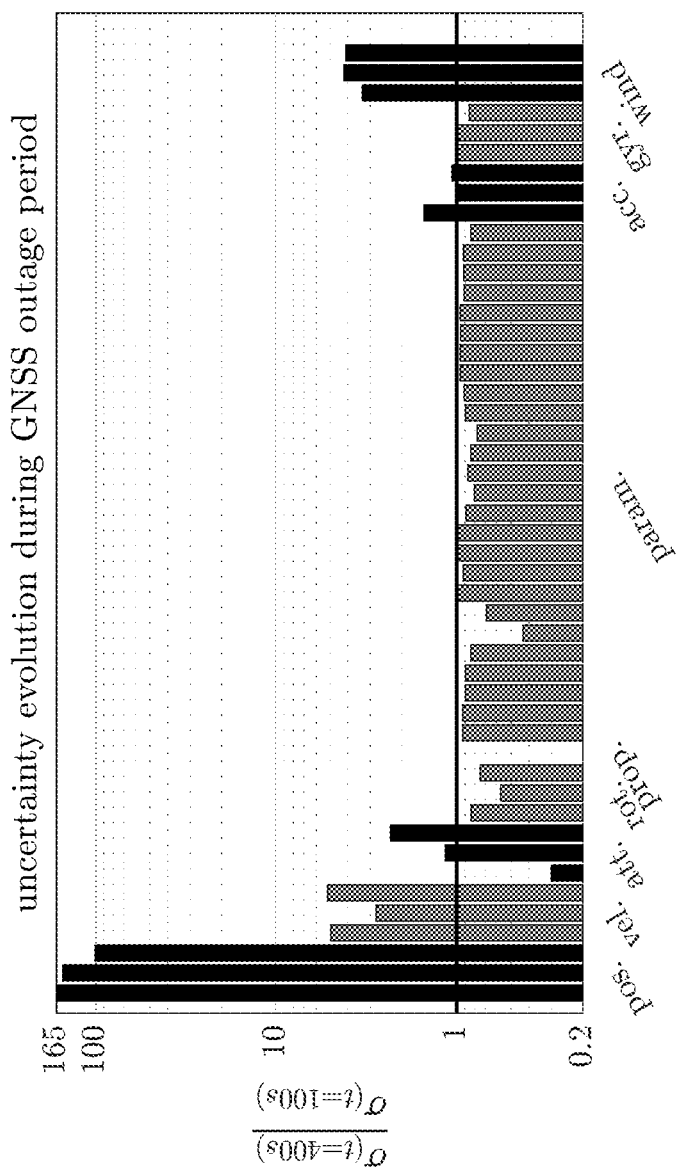

FIG. 13A illustrates ratios of uncertainties on states during GNSS presence periods and FIG. 13B illustrates ratios of uncertainties on states during GNSS outage periods. During the GNSS presence period (as illustrated in FIG. 13A), the uncertainties on all the states except a few VDM parameters were reduced significantly, indicating their observability, even during this relatively short period (i.e., 100 seconds) of stand-alone satellite positioning availability. The uncertainties on the VDM parameters were not increased either, which indicates no divergence is expected on their estimation. During GNSS outage, the uncertainty on position and velocity grew (as illustrated in FIG. 13B). The uncertainty on attitude was reduced by a factor of 0.3 for roll, and increased by factors of only 1.2 and 2.3 for pitch and yaw, respectively. These results are considered beneficial with respect to an attitude determination after 5 minutes of autonomous navigation. The uncertainty on rotation rates was reduced, thanks to the direct measurements from the IMU. In addition, the uncertainty on all VDM parameters was slightly reduced during GNSS outage, which means the filter was able to maintain the estimation on them even in the absence of GNSS measurements, and even slightly improve it. Conceptually, this was achieved by the redundancy of information on linear accelerations and rotation rates provided by the VDM and IMU. The uncertainty on IMU error terms was almost unchanged, which indicates the ability of the presently disclosed navigation filter to keep track of these errors even during GNSS data absence, which is not the case for inertial coasting. The uncertainty of wind velocity experienced an increase of almost 4 times, which is a useful result for navigation purposes. Further improvement can also be expected with the use of air speed sensor observations.

Figure 14:
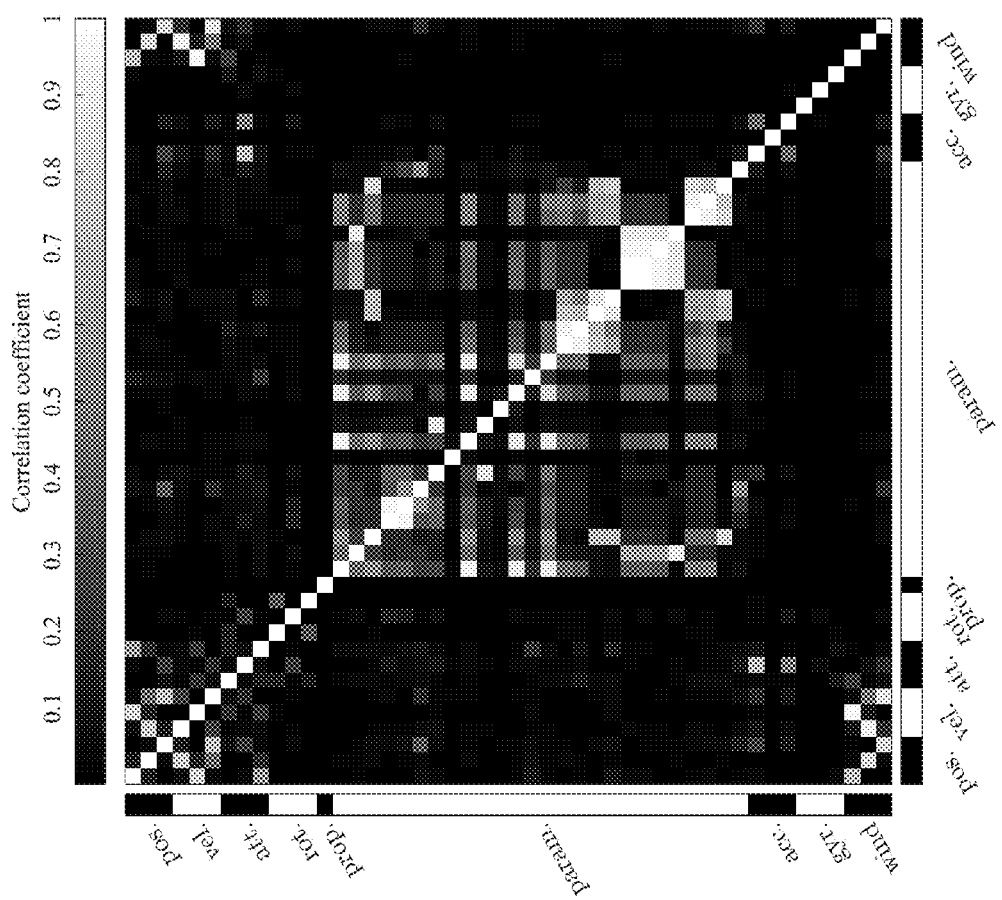
FIG. 14 illustrates a correlation matrix at the end of navigation.

FIG. 14 illustrates correlation coefficients among all the states within the herein disclosed navigation filter at the end of the navigation. As can be seen, the states were well decorrelated in general, which indicates good observability. The VDM parameters block showed the highest level of correlations, especially among different aerodynamic coefficients for roll, pitch, or yaw moments. This high level of correlation is distinguishable as almost all white small square blocks on the diagonal illustrated in FIG. 14. This means that rather than individual VDM parameters, groups of VDM parameters were getting estimated within the navigation filter. In this scenario, decorrelating individual VDM parameters demands longer time, more dynamic maneuvers, and possibly longer periods of GNSS availability. Considering these are practically constants for a particular navigation platform, their better estimation can be carried out only once during a calibration scenario. This results in lower uncertainties on their initial values for subsequent scenarios. For the purpose of navigation, and not necessarily parameter estimation, Monte Carlo simulations revealed that the VDM parameters were estimated adequately enough to enable the herein disclosed navigation platform to achieve a much better performance as compared to inertial coasting. Another point to notice is how well the VDM parameters decorrelated from other states of the navigation filter. There is also a considerable level of correlation between wind velocity components and position and velocity of the UAV. As depicted in FIG. 12, the uncertainty on wind velocity estimation grows steadily, yet slowly as time passes during GNSS outage. This is related to the level of process noise on the wind model. When gustier conditions are expected, higher values of process noise can be used to allow the capture of more sudden changes in wind velocity. This may come at the price of increasing the uncertainty on the navigation solution during GNSS outage. However, including air speed observations appears to be a good answer to such compromise.

Experimental Results

Figure 15:
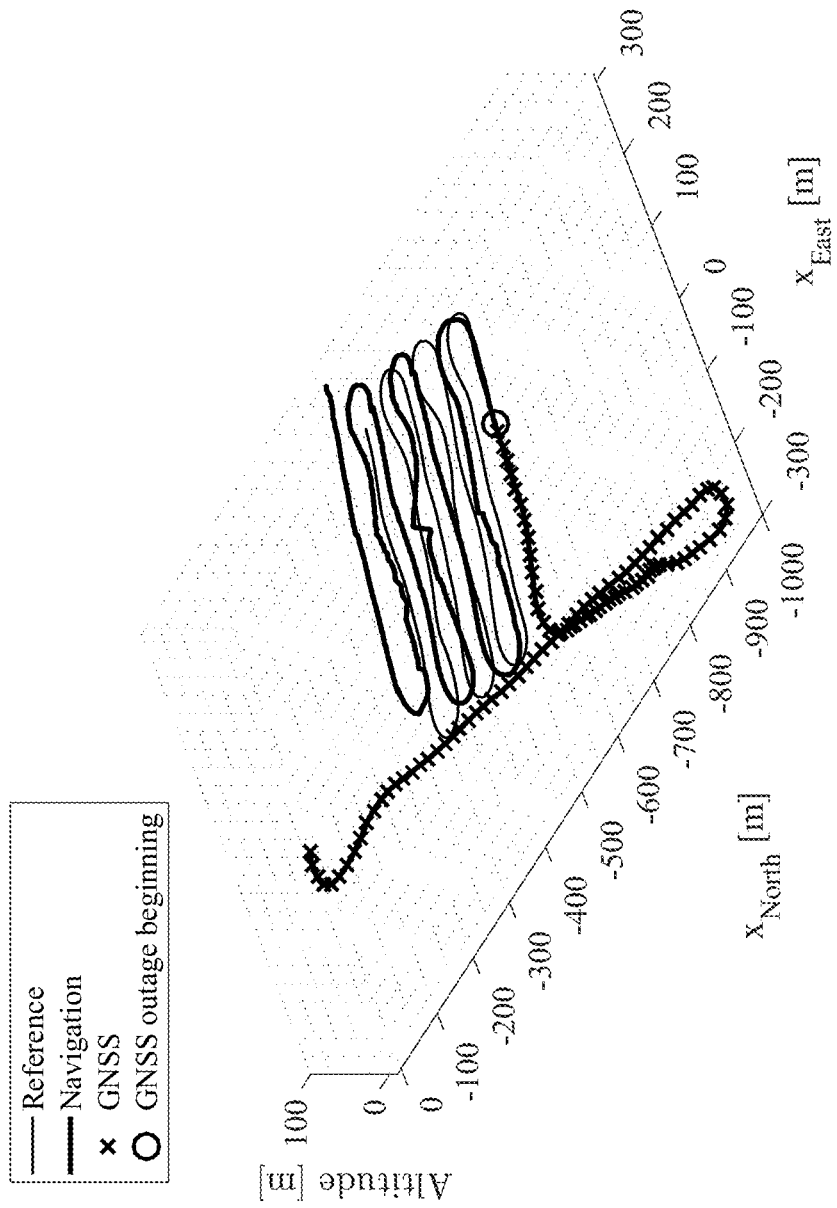
FIG. 15 illustrates a reference trajectory and navigation solution from a navigation system of the present disclosure during a test flight in a 3D view.
Figure 16:
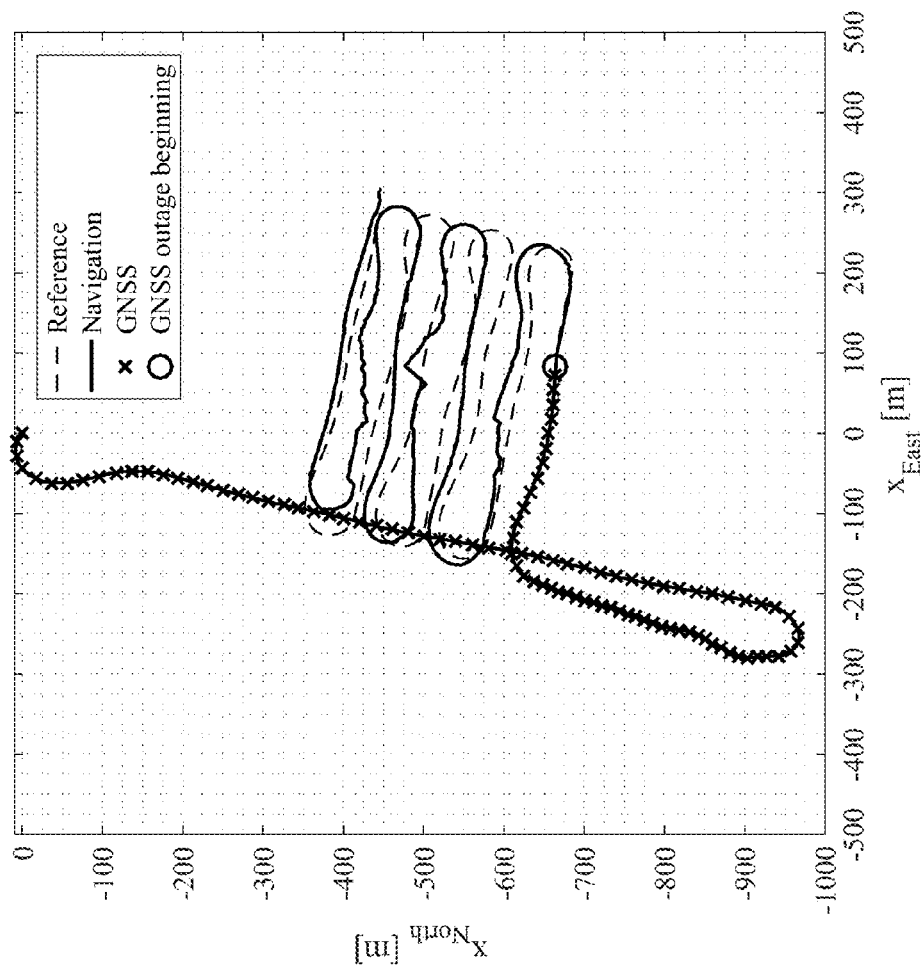
FIG. 16 illustrates a reference trajectory and navigation solution from a navigation system of the present disclosure during a test flight in a 2D view.

The following discusses results of a test flight using a navigation system as described herein. The UAV used to conduct the test flight is illustrated in and described with reference to FIG. 4. The navigation sensors used to conduct the test flight are detailed herein above. FIGS. 15 and 16 illustrate the reference trajectory obtained from a RTK GNSS solution not used within the navigation system, as well as a navigation solution provided by the herein described navigation system. Available standalone GNSS measurements that were used during navigation are also depicted in FIGS. 15 and 16, as well as a last available measurement after which an artificial GNSS outage had begun. The duration of the GNSS outage was 3 minutes. As can be seen in FIGS. 15 and 16, the navigation solution according to the navigation platform of the present disclosure, after 3 minutes of autonomous navigation during GNSS outage, was still following the reference trajectory with enough accuracy for the purpose of safe guidance (e.g., returning home, landing, etc.).

Figure 17:
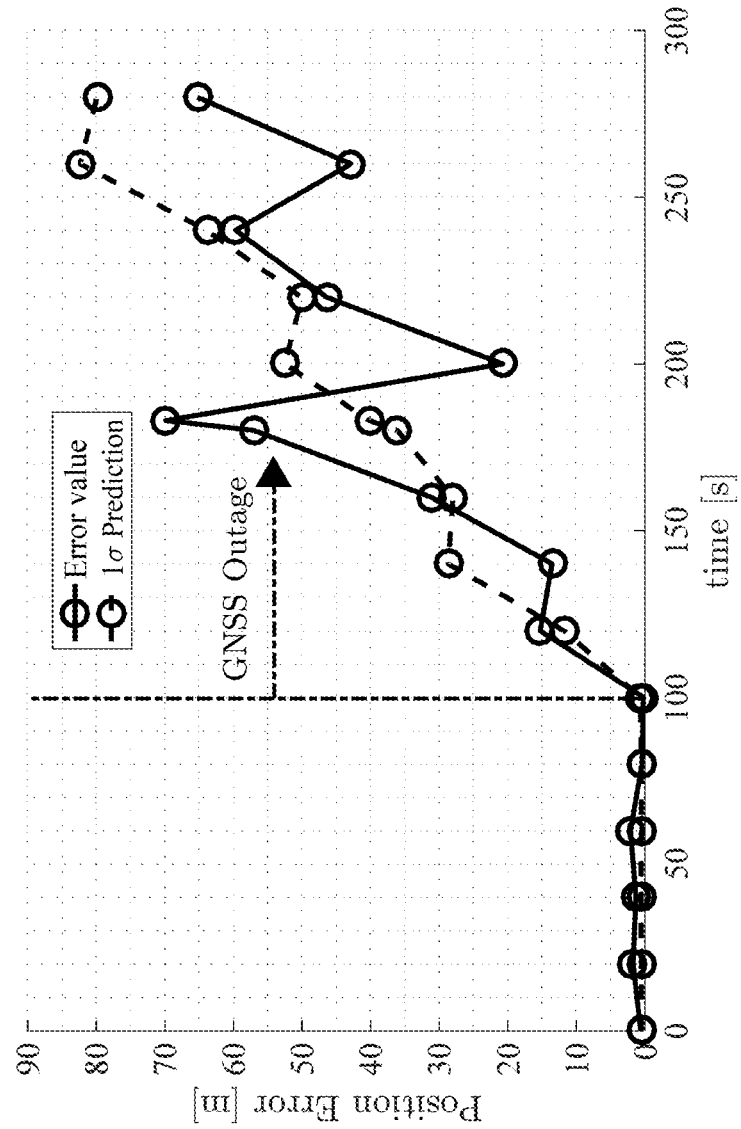
FIG. 17 illustrates position error for a navigation system of the present disclosure during a test flight.
Figure 18:
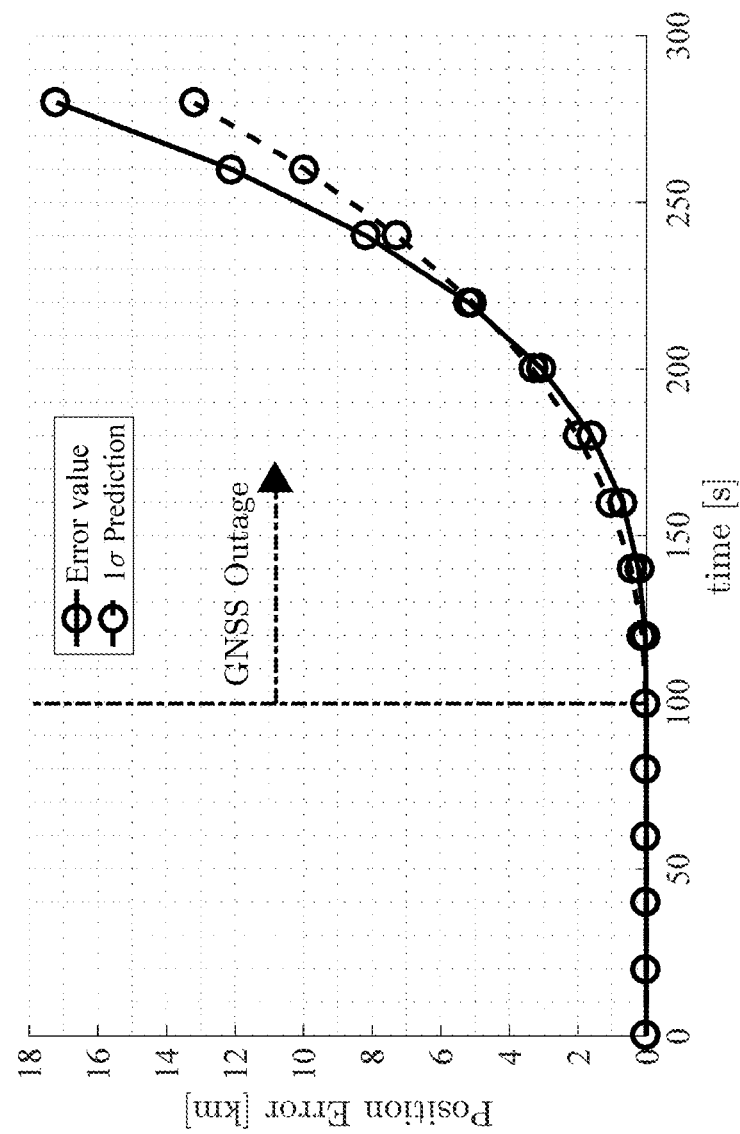
FIG. 18 illustrates position error for an INS/GNSS navigation system during a test flight.

To get quantitative measurements on navigation quality, the 3D position error over the whole trajectory was mapped (as illustrated in FIG. 17) for the navigation system of the present disclosure. FIG. 18 illustrates quantitative measurements on navigation quality for a conventional INS/GNSS navigation system. As shown in FIG. 17, the maximum position error after 3 minutes of autonomous navigation was 69.8 m for the navigation system of the present disclosure. For the conventional INS/GNSS navigation system, this error was almost 270 times greater, exceeding 17 km. This demonstrates more than two orders of magnitude improvement in positioning accuracy. For both conventional and the herein described navigation systems, the predicted accuracy within the navigation filter is in agreement with actual error.

Although illustrative embodiments of the present disclosure have been described herein with reference to the accompanying drawings, it is to be understood that the present disclosure is not limited to those precise embodiments, and that various other changes and modifications may be made by one skilled in the art without departing from the scope or spirit of the disclosure.

What is claimed is:

1. A navigation platform for autonomous and non-autonomous navigation of an unmanned aerial vehicle, comprising:
   an inertial measurement unit providing inertial measurements data;
   a global navigation satellite system device providing at least one of position measurement data, velocity measurement data, or receiver to satellite distance related measurements;
   at least one of an autopilot or a manual control device providing data of control input to actuators of the unmanned aerial vehicle; and
   a navigation system including:
      a self-calibrating vehicle dynamic model component providing linear and rotational accelerations of the unmanned aerial vehicle utilizing control input and previously estimated velocity and attitude, and
      a navigation filter using the vehicle dynamic model component as a main navigation process model for navigation of the unmanned aerial vehicle, the navigation filter receiving the data of control input to actuators of the unmanned aerial vehicle from the autopilot or the manual control device, the navigation filter receiving the inertial navigation data from the inertial measurement unit and updating an output of the vehicle dynamic model component with at least a portion of the inertial navigation data, the navigation filter receiving the at least one of position or velocity measurement data from the global navigation satellite system device when available and updating the output of the vehicle dynamic model component with the at least one of position or velocity measurement data when available, the navigation filter estimating position, velocity, attitude, and attitude rates of the unmanned aerial vehicle, the navigation filter estimating vehicle dynamic model parameters to calibrate the vehicle dynamic model component, the navigation filter estimating a wind velocity vector to provide the wind velocity to the vehicle dynamic model component, and the navigation filter estimating and compensating for errors in the inertial measurement unit.

2. The navigation platform of claim 1, further comprising at least one autonomous aiding device that provides navigation related data and wherein the navigation filter receives the navigation related data from the at least one autonomous aiding device and updates the output of the vehicle dynamic model component with at least a portion of the navigation related data.

3. The navigation platform of claim 1, further comprising at least one environment dependent aiding device that provides navigation related data, and wherein the navigation filter receives the navigation related data from the at least one environment dependent aiding device and updates the output of the vehicle dynamic model component with at least a portion of the navigation related data.

4. The navigation platform of claim 2, wherein the at least one autonomous aiding device includes at least one of a barometric altimeter, a magnetometer, or a speed sensor.

5. The navigation platform of claim 1, wherein the navigation system further includes at least one of a wind model and an inertial measurement unit error model, and wherein the navigation filter estimates the wind velocity using data provided by at least one of the wind model and the inertial measurement unit error model.

6. The navigation platform of claim 3, wherein the at least one environment dependent aiding device includes at least one of a radio frequency ranging device, a vision based sensor, an ultrasound sensor, or an optical flow sensor.

7. The navigation platform of claim 1, wherein the unmanned aerial vehicle is selected from the group consisting of a fixed-wing unmanned aerial vehicle and a rotary-wing unmanned aerial vehicle.

8. A navigation platform for autonomous and non-autonomous navigation of an unmanned aerial vehicle, comprising:
   an inertial measurement unit providing inertial navigation data;
   at least one of an autopilot or a manual control device providing data of control input to actuators of the unmanned aerial vehicle; and
   a navigation system including:
      a self-calibrating vehicle dynamic model component providing linear and rotational accelerations of the unmanned aerial vehicle utilizing control input and previously estimated velocity and attitude, and
      a navigation filter using the vehicle dynamic model component as a main navigation process model for navigation of the unmanned aerial vehicle, the navigation filter receiving the data of control input to actuators of the unmanned aerial vehicle from at least one of the autopilot or the manual control device, the navigation filter receiving the inertial navigation data from the inertial measurement unit and updating an output of the vehicle dynamic model component with at least a portion of the inertial navigation data, the navigation filter estimating position, velocity, attitude, and attitude rates of the unmanned aerial vehicle, the navigation filter estimating vehicle dynamic model parameters to calibrate the vehicle dynamic model component, the navigation filter estimating a wind velocity vector to provide the wind velocity to the vehicle dynamic model component, and the navigation filter estimating and compensating for errors in the inertial measurement unit.

9. The navigation platform of claim 8, further comprising at least one autonomous aiding device that provides navigation related data, and wherein the navigation filter receives the navigation related data from the at least one autonomous aiding device and updates the output of the vehicle dynamic model component with at least a portion of the navigation related data.

10. The navigation platform of claim 8, further comprising at least one environment dependent aiding device that provides navigation related data, and wherein the navigation filter receives the navigation related data from the at least one environment dependent aiding device and updates the output of the vehicle dynamic model component with at least a portion of the navigation related data.

11. The navigation platform of claim 9, wherein the at least one autonomous aiding device includes at least one of a barometric altimeter, a magnetometer, or a speed sensor.

12. The navigation platform of claim 8, wherein the navigation system further includes at least one of a wind model and an inertial measurement unit error model, and wherein the navigation filter estimates the wind velocity using data provided by at least one of the wind model and the inertial measurement unit error model.

13. The navigation platform of claim 10, wherein the at least one environment dependent aiding device including at least one of a radio frequency ranging device, a vision based sensor, an ultrasound sensor, or an optical flow sensor.

14. The navigation platform of claim 8, wherein the unmanned aerial vehicle is selected from the group consisting of a fixed-wing unmanned aerial vehicle and a rotary-wing unmanned aerial vehicle.

15. A navigation platform for autonomous and non-autonomous navigation of an unmanned aerial vehicle, comprising:
   a global navigation satellite system device providing at least one of position measurement data, velocity measurement data, or receiver to satellite distance related measurements;
   at least one of an autopilot or a manual control device providing data of control input to actuators of the unmanned aerial vehicle, the data of control input to actuators of the unmanned aerial vehicle; and
   a navigation system including:
      a self-calibrating vehicle dynamic model component providing linear and rotational accelerations of the unmanned aerial vehicle utilizing control input and previously estimated velocity and attitude, and
      a navigation filter using the vehicle dynamic model component as a main navigation process model for navigation of the unmanned aerial vehicle, the navigation filter receiving the data of control input to actuators of the unmanned aerial vehicle from at least one of the autopilot or the manual control device, the navigation filter receiving the at least one of position or velocity measurement data from the global navigation satellite system device when available and updating the output of the vehicle dynamic model component with the at least one of position or velocity measurement data when available, the navigation filter estimating position, velocity, attitude, and attitude rates of the unmanned aerial vehicle, the navigation filter estimating vehicle dynamic model parameters to calibrate the vehicle dynamic model component, and the navigation filter estimating a wind velocity vector to provide the wind velocity to the vehicle dynamic model component.

16. The navigation platform of claim 15, further comprising at least one autonomous aiding device that provides navigation related data, and wherein the navigation filter receives the navigation related data from the at least one autonomous aiding device and updates the output of the vehicle dynamic model component with at least a portion of the navigation related data.

17. The navigation platform of claim 15, further comprising at least one environment dependent aiding device that provides navigation related data and wherein the navigation filter receives the navigation related data from the at least one environment dependent aiding device and updates the output of the vehicle dynamic model component with at least a portion of the navigation related data.

18. The navigation platform of claim 17, wherein the at least one autonomous aiding device includes at least one of a barometric altimeter, a magnetometer, or a speed sensor the radio frequency ranging device is a global navigation satellite system.

19. The navigation platform of claim 15, wherein the navigation system further includes at least one of a wind model and an inertial measurement unit error model, and wherein the navigation filter estimates the wind velocity using data provided by at least one of the wind model and the inertial measurement unit error model.

20. The navigation platform of claim 17, wherein the at least one environment dependent aiding device including at least one of a radio frequency ranging device, a vision based sensor, an ultrasound sensor, or an optical flow sensor.

* * * * *